United States Patent
Kingma et al.

(10) Patent No.: US 10,087,399 B2
(45) Date of Patent: Oct. 2, 2018

(54) USE OF ALKOXYLATED NON-IONIC SURFACTANTS AS ADDITIVE IN AQUEOUS MEMBRANE CLEANING COMPOSITIONS

(71) Applicant: BASF SE, Ludwigshafen (DE)

(72) Inventors: Arend Jouke Kingma, Weisenheim am Sand (DE); Diana Neumann, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 33 days.

(21) Appl. No.: 14/414,125

(22) PCT Filed: Jun. 21, 2013

(86) PCT No.: PCT/EP2013/063038
§ 371 (c)(1),
(2) Date: Jan. 12, 2015

(87) PCT Pub. No.: WO2013/164492
PCT Pub. Date: Nov. 7, 2013

(65) Prior Publication Data
US 2015/0175936 A1    Jun. 25, 2015

(30) Foreign Application Priority Data

Jul. 13, 2012 (EP) .................................. 12176406

(51) Int. Cl.
C11D 1/72 (2006.01)
C11D 17/00 (2006.01)
(Continued)

(52) U.S. Cl.
CPC ............... *C11D 1/72* (2013.01); *B01D 65/02* (2013.01); *C11D 1/42* (2013.01); *C11D 1/44* (2013.01);
(Continued)

(58) Field of Classification Search
CPC ....................................................... C11D 1/72
(Continued)

(56) References Cited

U.S. PATENT DOCUMENTS

| 4,137,044 A | * | 1/1979 | Flower ...................... D06L 1/16 134/26 |
| 5,789,239 A | | 8/1998 | Eyers et al. |

(Continued)

FOREIGN PATENT DOCUMENTS

| CA | 2313870 A1 * | 1/2001 | ............. A01N 37/16 |
| CA | 2313870 A1 | 1/2001 | |

(Continued)

OTHER PUBLICATIONS

STIC Search.*

(Continued)

*Primary Examiner* — Mark Eashoo
*Assistant Examiner* — M. Reza Asdjodi
(74) *Attorney, Agent, or Firm* — Drinker Biddle & Reath LLP

(57) ABSTRACT

The object of the present invention relates to the use of an branched alkoxylated non-ionic surfactant as an additive to an aqueous membrane cleaning composition, wherein the surfactant has an $HLB_d$ value of 9 to 12.5 and an average degree of branching $B_s \geq 1.5$ and wherein the surfactant has the following formula:

$$R-X-\left[\underset{R^2}{\underset{|}{\overset{R^1}{\overset{|}{C}}}}\right]_n O-\left[\phantom{x}\right]_m O-\left[\underset{}{\underset{}{\overset{R^3}{\overset{|}{C}}}}\right] O-H, \quad (I)$$

(Continued)

Fluorescence spectroscopy pictures of fouling layers after cleaning for layers A, G and H of Table 11.

A    G    H wherein
R is a C8-C18 linear or branched hydrocarbon chain,
X is O or N,
$R^1$, $R^2$ and $R^3$ independently of one another are hydrogen, methyl, ethyl, propyl, isopropyl, or a mixture of these,
n has a value of from 1 to 8,
m has a value of from 1 to 8,
p has a value of from 0 to 8.

14 Claims, 13 Drawing Sheets

(51) Int. Cl.
    *C11D 11/00*     (2006.01)
    *C11D 1/42*     (2006.01)
    *C11D 1/44*     (2006.01)
    *C11D 1/722*     (2006.01)
    *B01D 65/02*     (2006.01)

(52) U.S. Cl.
    CPC ............. *C11D 1/721* (2013.01); *C11D 1/722* (2013.01); *C11D 11/0011* (2013.01); *C11D 17/0008* (2013.01); *B01D 2321/168* (2013.01)

(58) Field of Classification Search
    USPC ........................................................ 510/162
    See application file for complete search history.

(56) References Cited

U.S. PATENT DOCUMENTS

| | | | | |
|---|---|---|---|---|
| 6,288,019 | B1* | 9/2001 | Mertens | C11D 1/02 510/365 |
| 6,398,820 | B1* | 6/2002 | Merz | C11D 1/83 134/10 |
| 6,454,871 | B1* | 9/2002 | Labib | A61C 1/0076 134/22.12 |
| 2002/0004473 | A1* | 1/2002 | Busch | C11D 3/168 510/302 |
| 2003/0047510 | A1* | 3/2003 | Baldridge | B01D 61/04 210/632 |
| 2003/0153481 | A1* | 8/2003 | Kischkel | C11D 1/721 510/421 |
| 2004/0014624 | A1* | 1/2004 | Bolkan | C11D 1/146 510/296 |
| 2005/0215452 | A1 | 9/2005 | Ruland et al. | |
| 2005/0227899 | A1* | 10/2005 | Shamayeli | C11D 17/003 510/421 |
| 2007/0065391 | A1* | 3/2007 | Klumpe | C07C 43/11 424/70.31 |
| 2009/0200234 | A1* | 8/2009 | Schacht | B01D 65/02 210/636 |
| 2010/0257676 | A1* | 10/2010 | Shamayeli | C11D 17/0017 8/137 |
| 2011/0177945 | A1* | 7/2011 | Klingelhoefer | A01N 25/30 504/100 |
| 2011/0269210 | A1* | 11/2011 | Yoon | C11D 3/386 435/188 |
| 2011/0319669 | A1* | 12/2011 | Yu | C07C 43/11 568/618 |
| 2012/0045817 | A1* | 2/2012 | Estell | C11D 3/38681 435/192 |
| 2013/0231508 | A1* | 9/2013 | Maynard | C07C 43/11 568/618 |

FOREIGN PATENT DOCUMENTS

| | | | | |
|---|---|---|---|---|
| DE | 4445070 | A1 | 6/1996 | |
| DE | 19726287 | A1 | 12/1998 | |
| EP | 1068873 | A1 | 1/2001 | |
| EP | 1308499 | A1 | 5/2003 | |
| EP | 1675311 | A1 | 7/2006 | |
| EP | 2164939 | A1 | 3/2010 | |
| WO | WO-0246351 | A1 | 6/2002 | |
| WO | WO-03022752 | A1 | 3/2003 | |
| WO | WO 2005118760 | A1 * | 12/2005 | ........... C11D 3/2003 |
| WO | WO-2005118760 | A1 | 12/2005 | |

OTHER PUBLICATIONS

Yamagiwa, K., et al., "Membrane Fouling in Ultrafiltration of Hydrophobic Nonionic Surfactant", Journal of Chemical Engineering of Japan, vol. 26, No. 1, (1993), pp. 13-18.

"FT30 Membrane Description", FILMTEC Membranes Product Information (1998).

$ECH_2O$ Tec. Watermakers Beach House Series (Vertical System) 1000-BHL-2/1300-BHS-3/1800-BHL-4 Owners Manual, www.watermakers.net, 17 pages.

International Preliminary Report on Patentability for PCT/EP2013/063038 dated Jan. 13, 2015.

International Search Report for PCT/EP2013/063038 dated Sep. 11, 2013.

\* cited by examiner

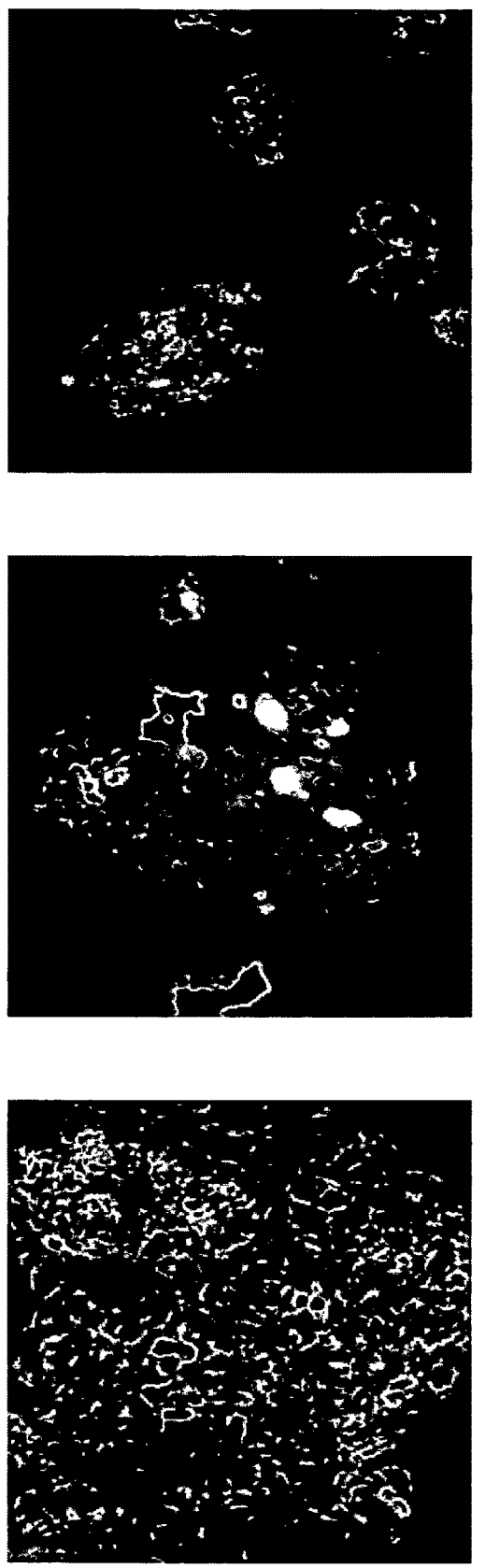
Figure 13: Fluorescence spectroscopy pictures of fouling layers after cleaning for layers A, G and H of Table 11.

USE OF ALKOXYLATED NON-IONIC SURFACTANTS AS ADDITIVE IN AQUEOUS MEMBRANE CLEANING COMPOSITIONS

CROSS-REFERENCE TO RELATED APPLICATIONS

This application is a national stage application (under 35 U.S.C. § 371) of PCT/EP2013/063038, filed Jun. 21, 2013, which claims benefit of European Application No. 12176406.2, filed Jul. 13, 2012, both of which are incorporated herein by reference in their entirety.

The object of the present invention relates to the use of branched alkoxylated non-ionic surfactants as an additive to an aqueous membrane cleaning composition, wherein the surfactant has an $HLB_d$ value of 9 to 12.5 and an average degree of branching $B_s \geq 1.5$.

In many industrial applications related to the purification of water, such as waste water treatment or seawater desalination, membranes are used to separate water from salt and/or further impurities. The widely used membrane processes include microfiltration, ultrafiltration, nanofiltration, reverse osmosis, electrolysis and dialysis. Microfiltration and ultrafiltration are widely used in food and beverage processing (beer microfiltration, concentration of whey), biotechnological applications and pharmaceutical industry (antibiotic production, protein purification), water purification and waste water treatment, microelectronics industry, and others. Nanofiltration and reverse osmosis membranes are mainly used for water purification purposes (i.e. desalination of water). The performance of a membrane is determined by the size of the pores and the surface material of the membrane. Typical membrane materials are polysulfone, polyethersulfone, polyamide, polyacrylonitrile, polyvinylidene difluoride and polyimide. The separation mechanism during the cleaning process is conceived as a sieving action, where an increase in applied pressure increases the flux rate. However, membranes can be fouled by adsorption or deposition of some substances present in the separation process, which leads to the pores of the membranes to get clogged by salt and/or further impurities. This contributes to a decrease of the membrane performance in the separation process. Fouling mainly stems from three sources, namely particles in the feed water, buildup of sparsely soluble minerals and microorganism growth. All of these conditions require frequent cleaning. The cleaning processes used so far consist in using a cleaning solution of surfactants at a very acidic, neutral or very basic pH (intensive cleaning) and/or applying an inverse pressure to the membrane (chemical enhanced backwash). Mostly anionic surfactants (LAS) are used in the cleaning solutions, because until now, no effective nonionic surfactants are known that do not clog the membranes. The surfactant concentration in the used cleaning solutions, if applied, lays between 100 ppm and 1000 ppm, limited due to the foaming of the anionic surfactant. Non-ionic surfactants tend to display an affinity to the membranes or show poor cleaning efficiency of the membrane. They are difficult to be washed off later on and tend themselves to clog the pores of the membrane (Owners manual ECH2O Tec. Watermakers, 1000-BHL-2, page 9; DOW Filmtec, Form No. 609-01010-498QRP; Hydranautics Technical Application Bulletin No 109, Feb. 22, 2002, Revision B, page 3; K. Yamagiwa, H. Kobayashi, A. Ohkawa, M. Onodura, J. Chem. Eng Jp 26, Not, 13, 1993). Ionic surfactants are thus more often used but have the disadvantage that they produce foam during the membrane cleaning process.

WO03/022752 reads on mixtures containing enzymes and surfactants used in a method for reducing biofilm in an aqueous system, said system being a crossflow filtration system or a reverse osmosis system. The surfactants used may be either non-ionic, anionic, amphoteric, cationic or a combination thereof.

EP 2 164 939 B1 relates to a liquid detergent composition comprising a Guerbet alcohol ethoxylate of the formula $R_1$—$(OC_2H_4)_n$—OH, wherein $R_1$ is a $C_9$ to $C_{20}$ alkyl group and n is from 2 to 10. The liquid detergent composition for washing textiles contains components which do not affect the filtration process in the membrane filtration unit used to clean the waste water of the textile washing process.

WO 2005/118760 A1 describes a past-like cleaning or detergent composition for washing textiles appropriate to be used in the purification of the waste water from the washing process comprising fatty alcohol alkoxylates. Said fatty alcohol alkoxylates have the general formula R-(EO)x-(PO)y, in which R can be branched C8 to C22 alkyl chain and the sum of y and y is at least 5.

US2009/0200234 describes a method for removing soil from a membrane by applying an acidic active oxygen use solution and afterwards an alkaline override solution. The acidic active oxygen solution comprises a peroxygen compound and a surfactant, which can be non-ionic, anionic, cationic, amphoteric, zwitterionic or a mixture thereof.

DE197 26 287 A1 discloses a product composition used in a method for cleaning fabrics on an industrial scale, wherein the product composition comprises linear and/or branched ethoxylated and/or propoxylated $C_8$-$C_{18}$ fatty alcohols. The waste water accumulated during the process is treated by means of a membrane filtration unit.

WO02/46351 A1 reads on a detergent or cleaning agent containing an ethoxylated branched or unbranched C10-C20 fatty alcohol, wherein the average degree of ethoxylation has a value of from 5 to 20. The waste water accumulated during the process is treated by means of a membrane filtration unit.

DE 44 45 070 A1 discloses a method for the removal of biofilm or the prevention of slime formation on surfaces of a water-bearing system by adding to the system an enzyme and a glycol component. The glycol component has the following formula: $R^2(O-R^1)_n$–O—$R^3$, wherein n is an integer smaller than 10, $R^1$ is an alkylresidue with 2 or 3 carbon atoms and $R^2$ and $R^3$ are in each case independently of each other hydrogen, an alkyl group with 1 to 6 carbon atoms or an aryl group. It was therefore an object of the invention to find nonionic surfactants which would not deposit onto the membranes and clog the pores while being low foaming and are displaying a good and fast cleaning performance in aqueous solutions used to clean membranes.

BRIEF DESCRIPTION OF THE DRAWINGS

FIG. 13 shows fluorescence spectroscopy pictures of fouling layers after cleaning for layers A. G, and H of Table 11, below.

DETAILED DESCRIPTION OF THE INVENTION

Figure 1:
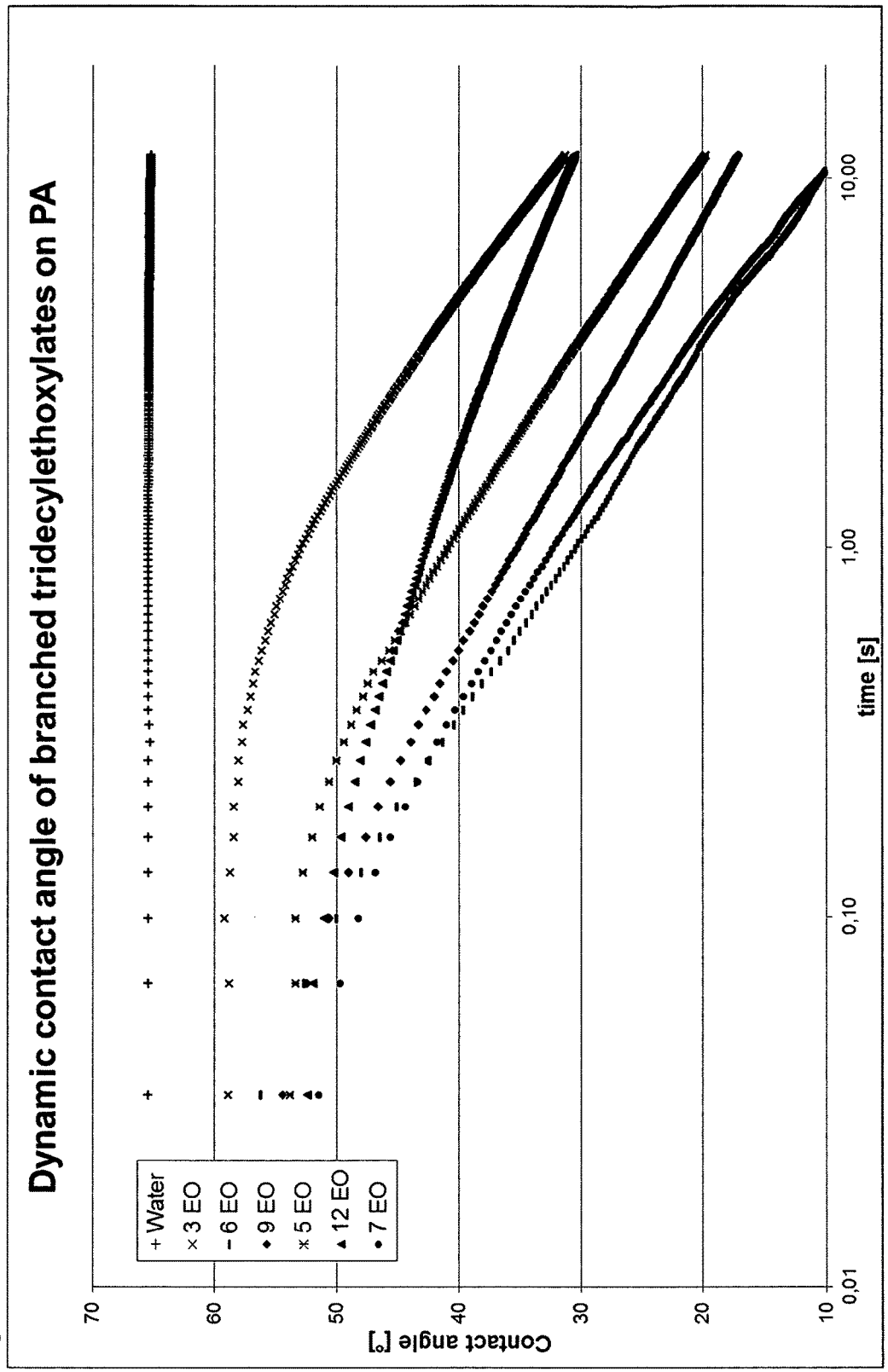
FIG. 1 shows dynamic contact angle of branched tridecylethoxylates on PA.
Figure 2:
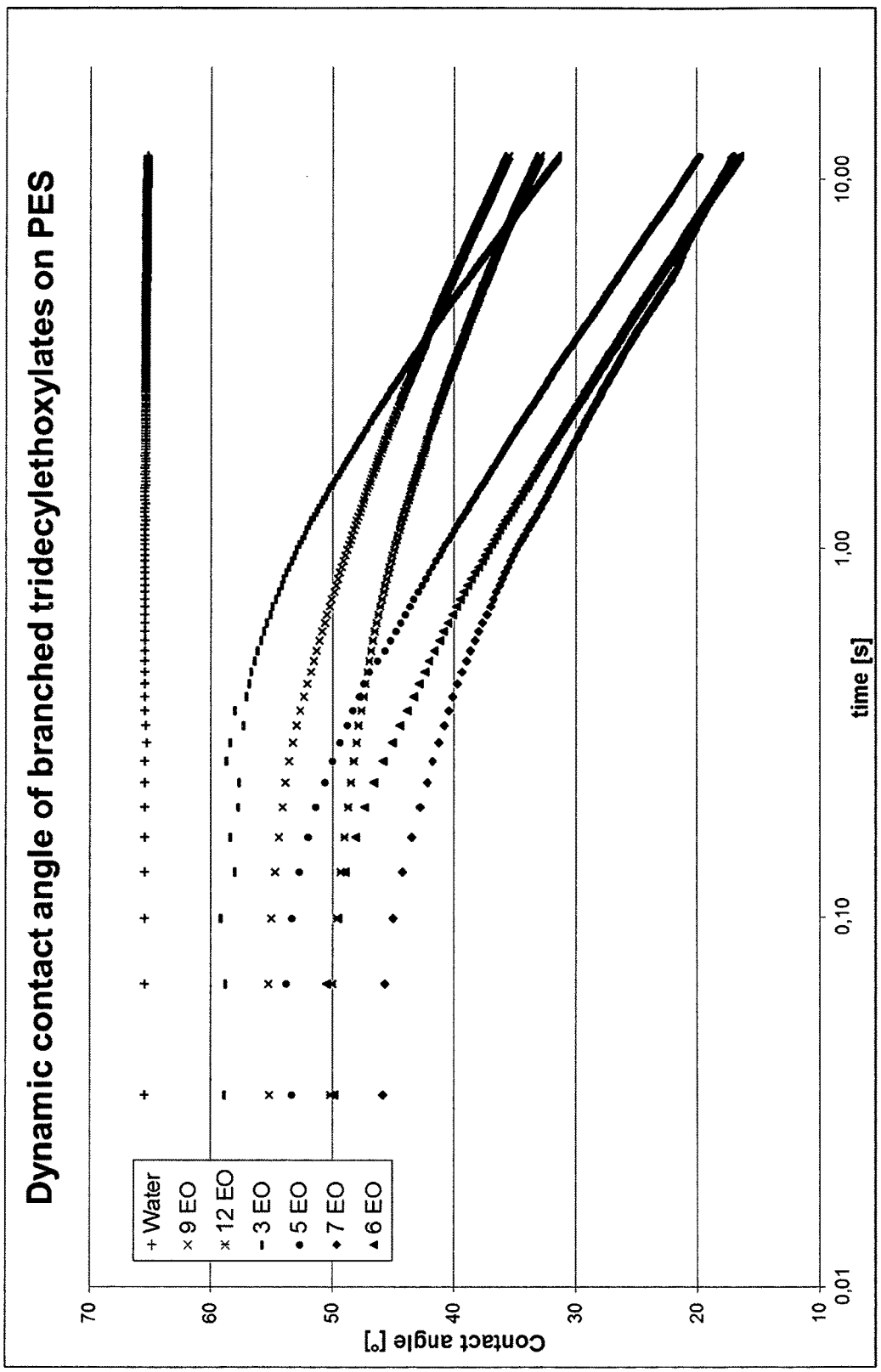
FIG. 2 shows dynamic contact angle of branched tridecylethoxylates on PES.
Figure 3:
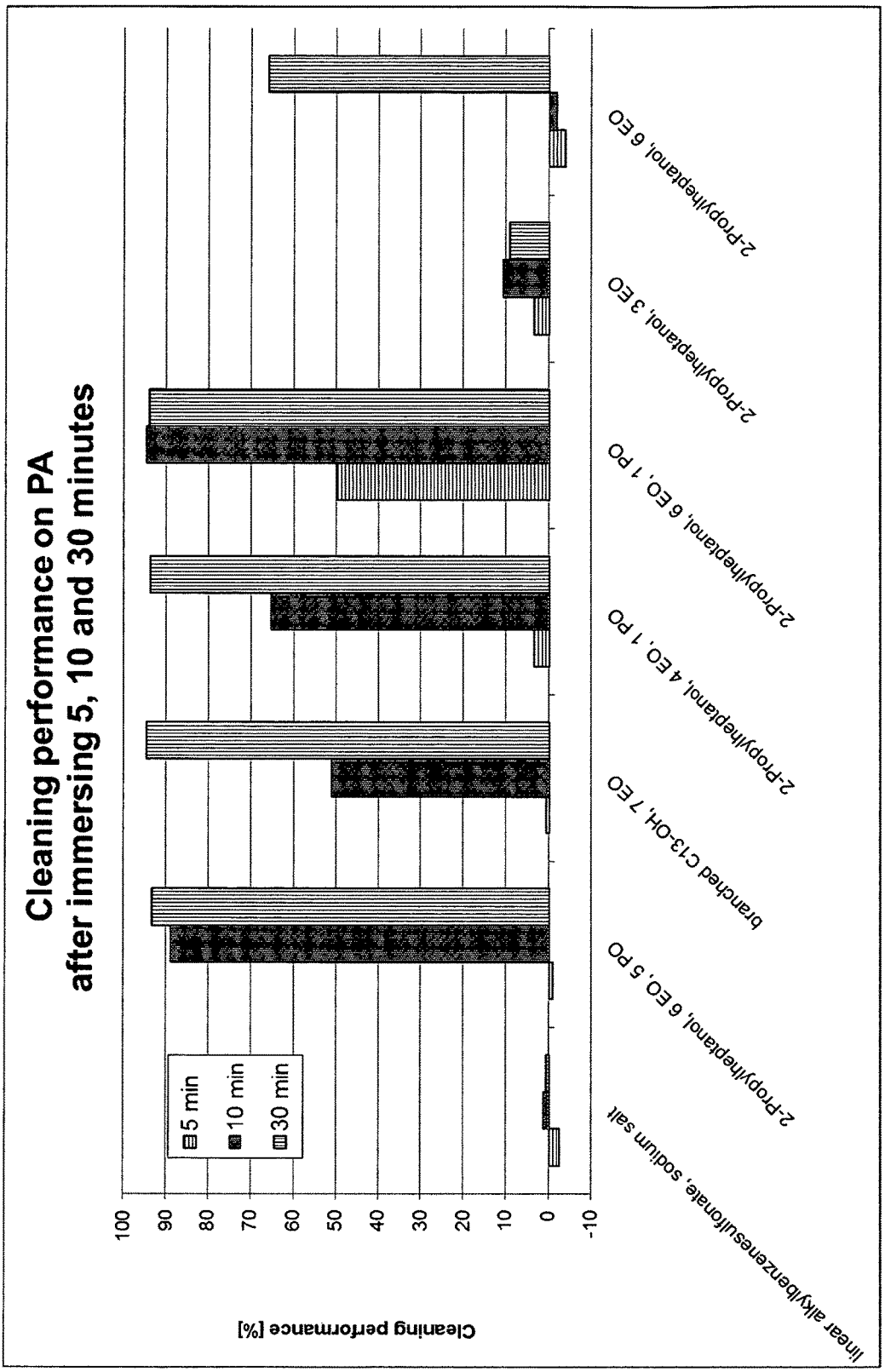
FIG. 3 shows cleaning performance after immersing 5, 10, and 30 minutes.
Figure 4:
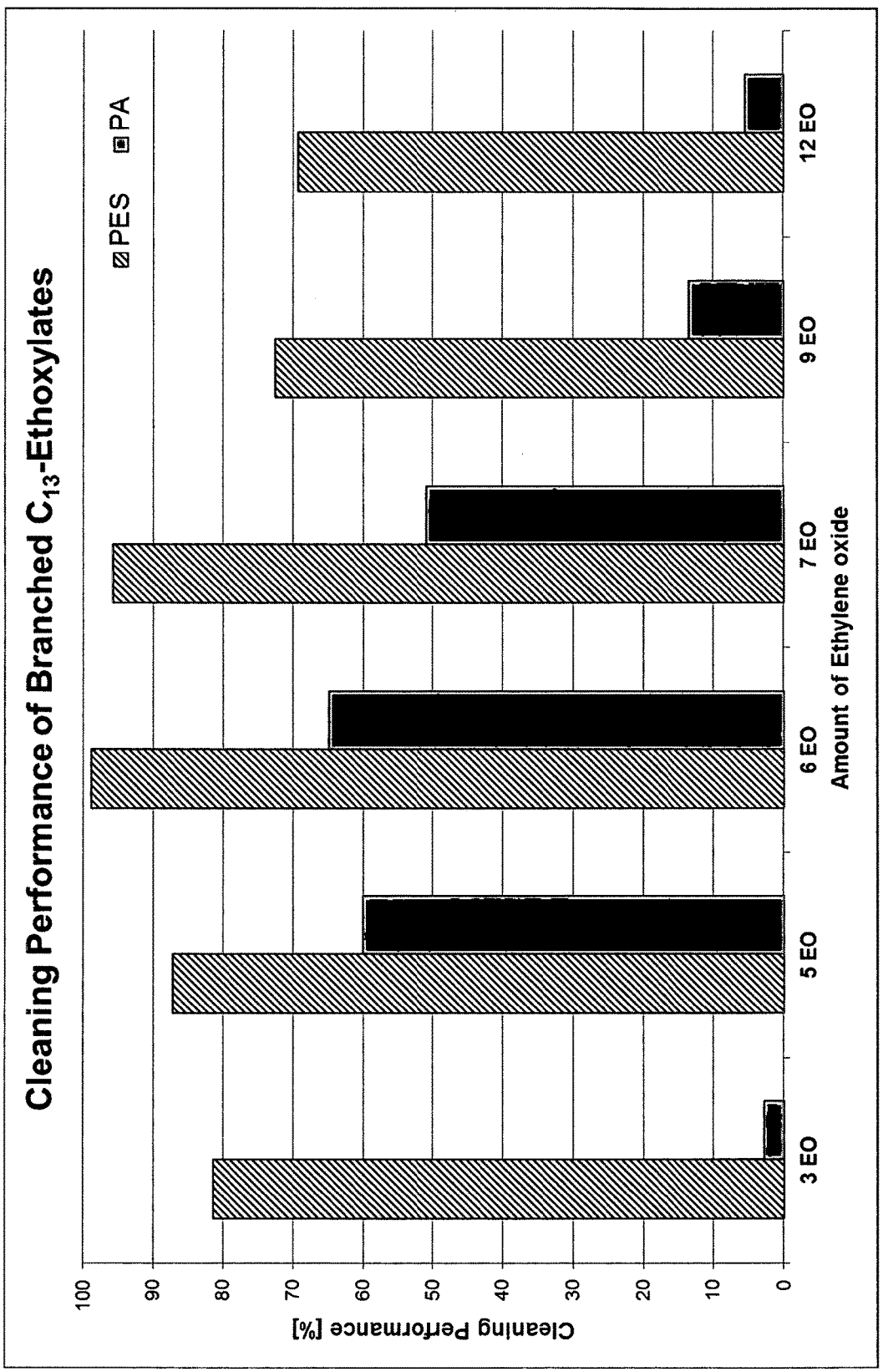
FIG. 4 shows performance of branched $C_{13}$-ethoxylates.
Figure 5:
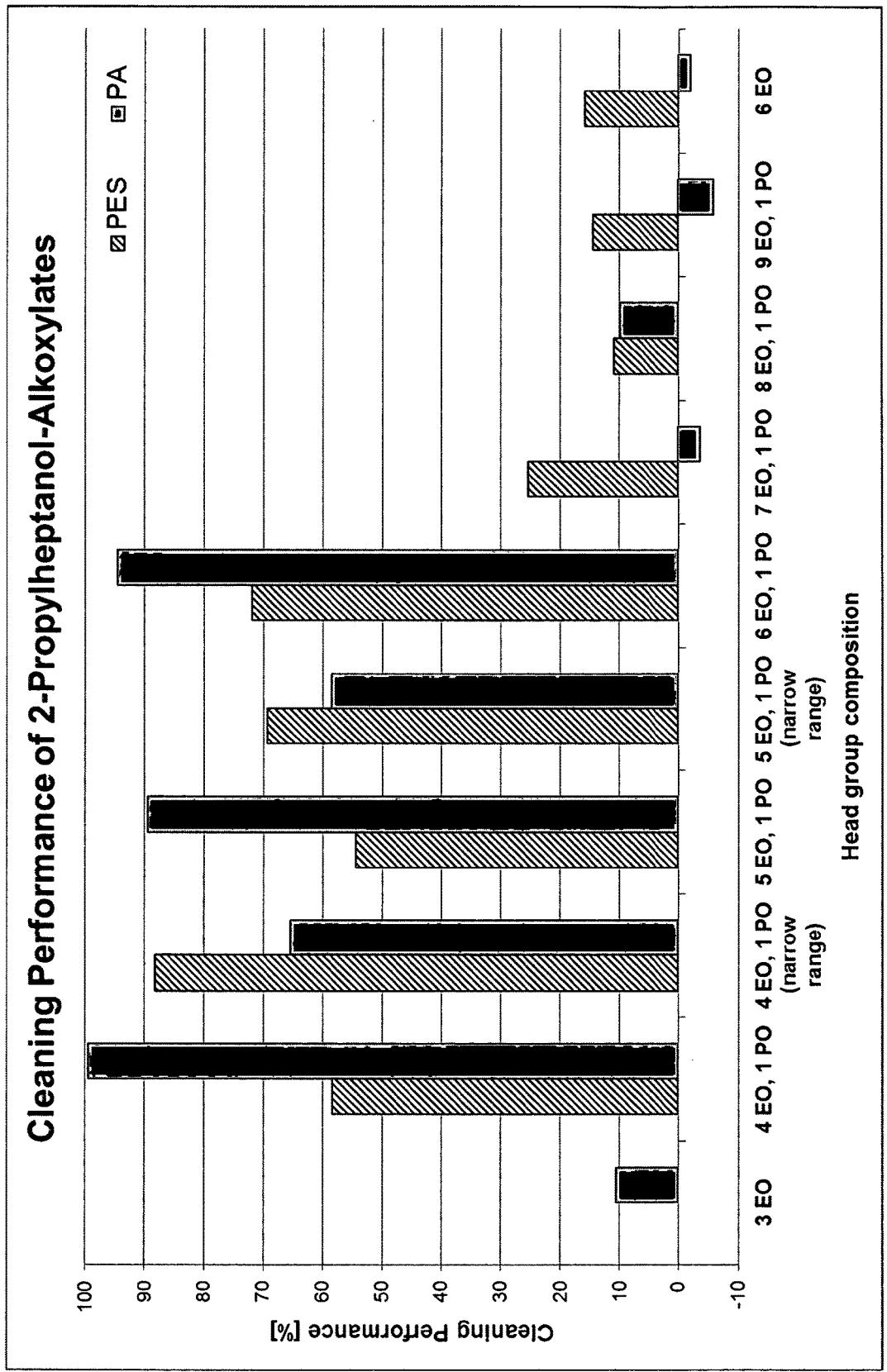
FIG. 5 shows cleaning performance of 2-propylheptanol-alkoxylates.
Figure 6:
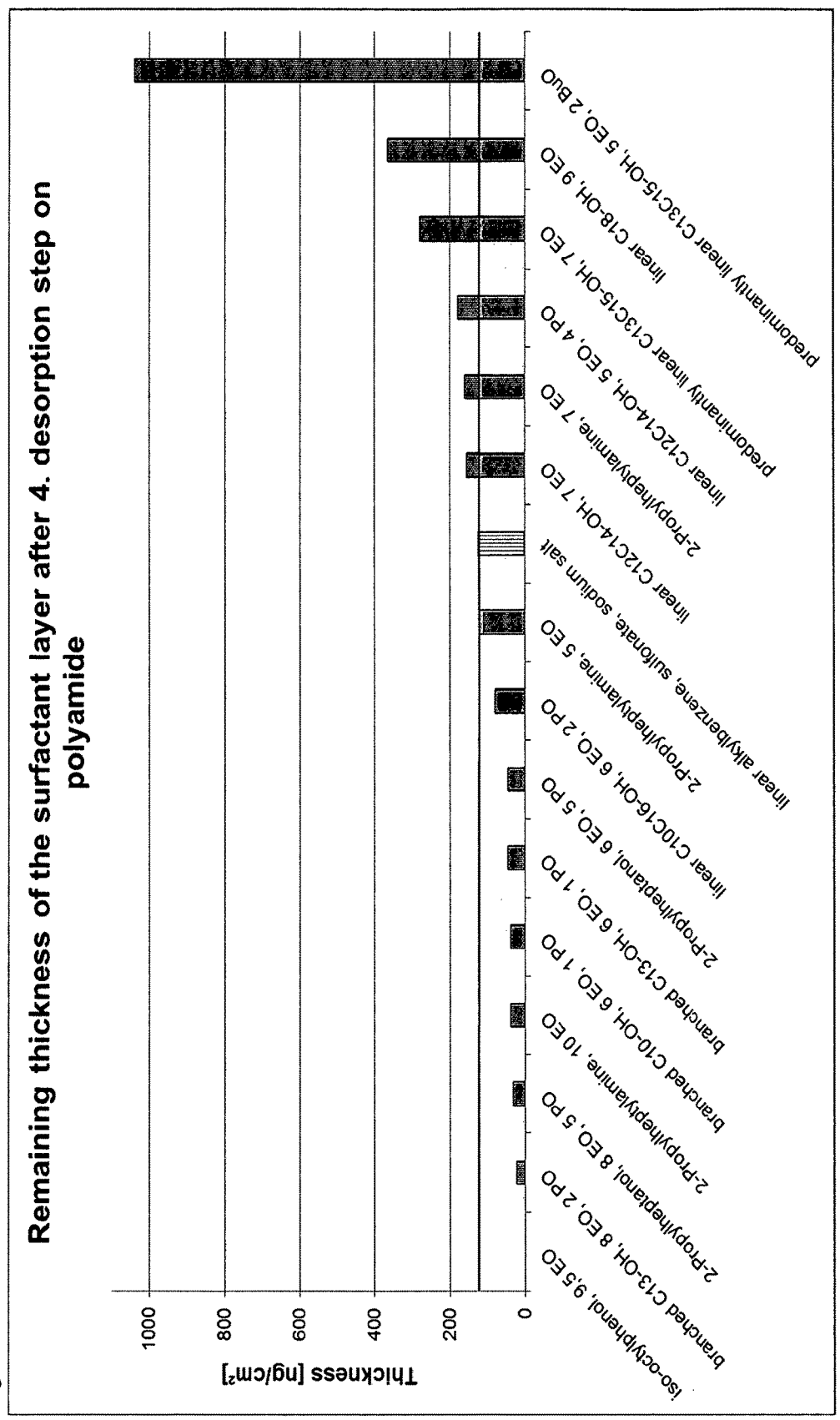
FIG. 6 shows remaining thickness of the surfactant layer after 4. desorption step on polyamide.
Figure 7:
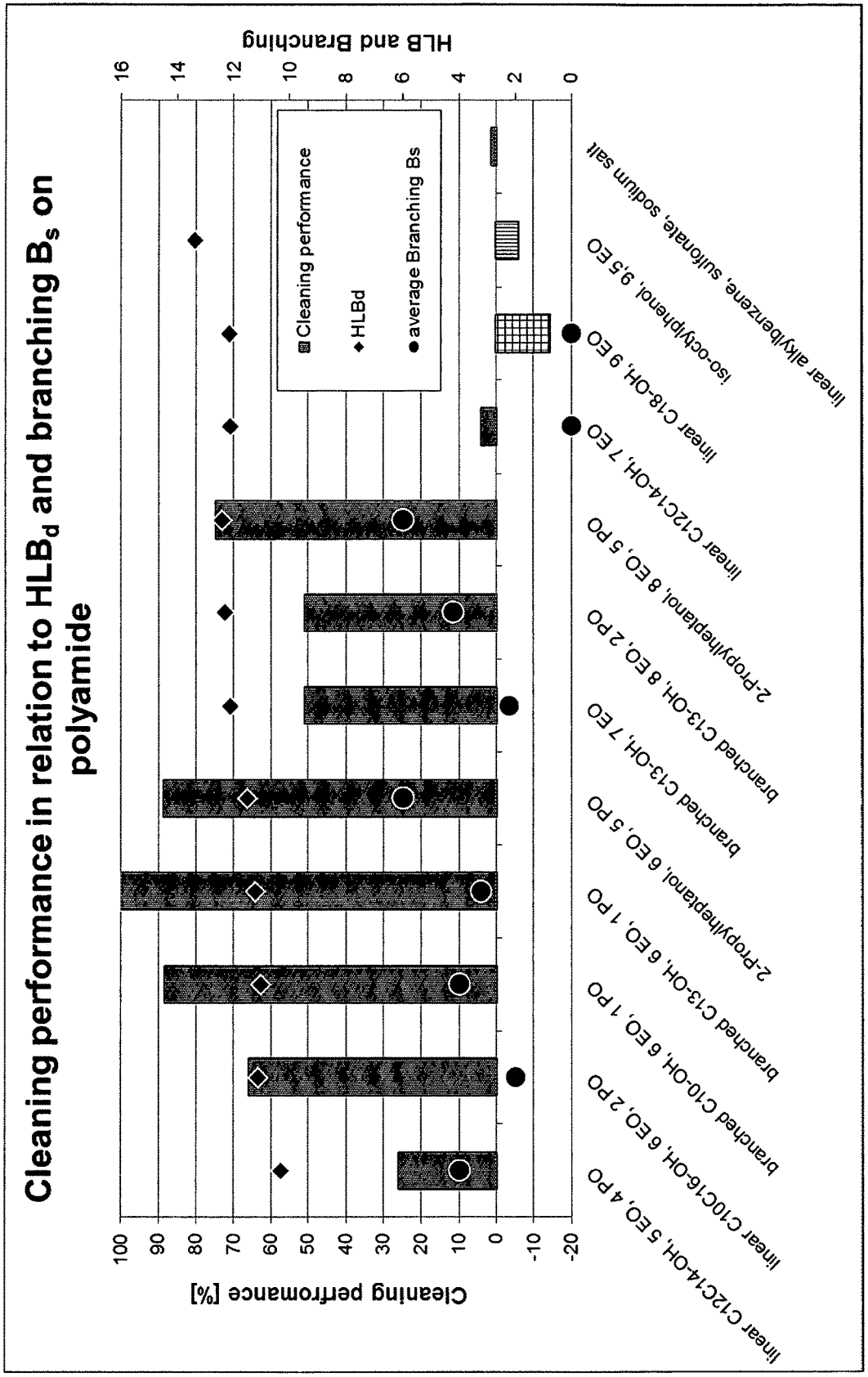
FIG. 7 shows cleaning performance in relation to $HLB_d$ and branching $B_s$ on polyamide.
Figure 8:
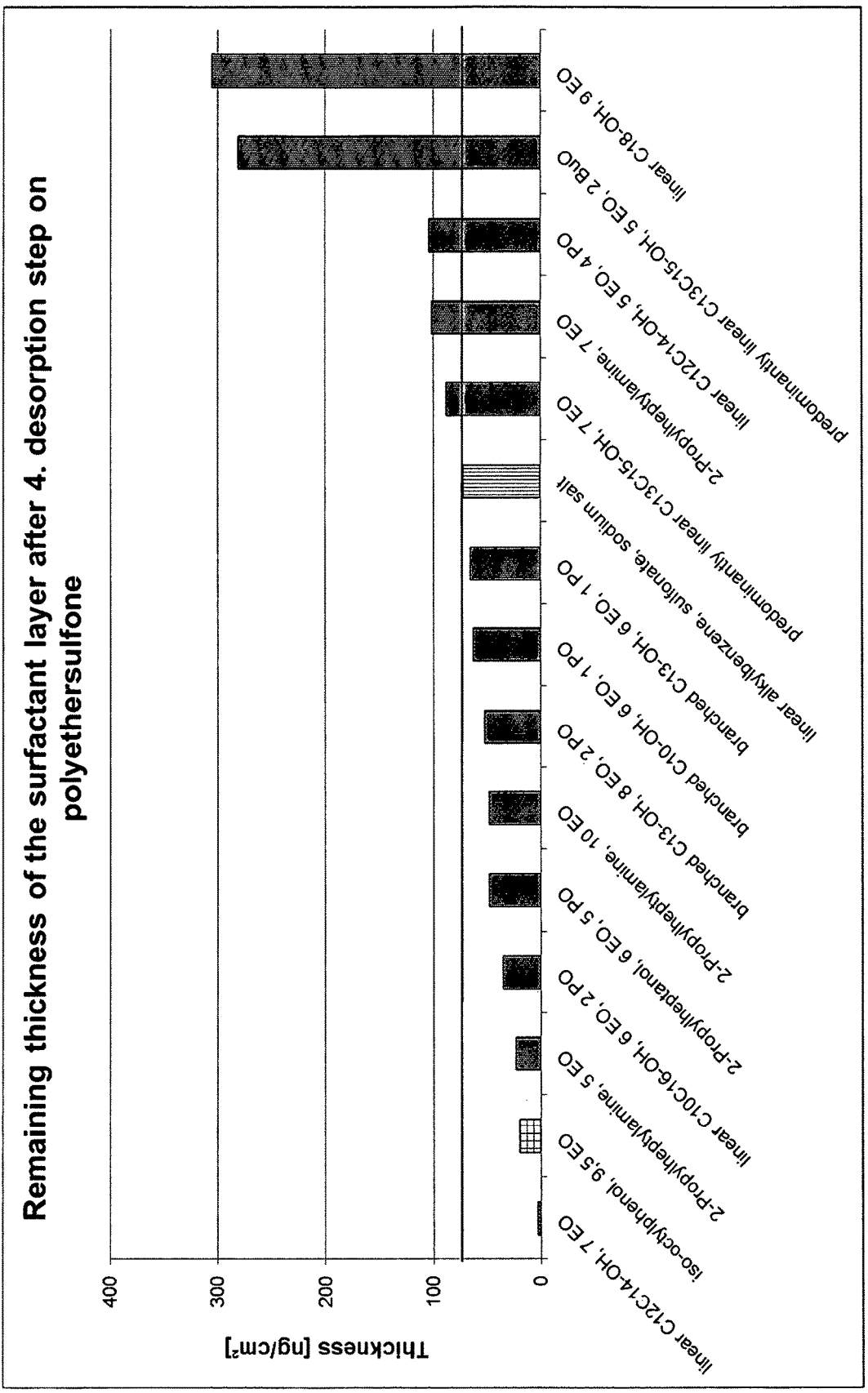
FIG. 8 shows remaining thickness of the surfactant layer after 4. desorption step on polyethersulfone.
Figure 9:
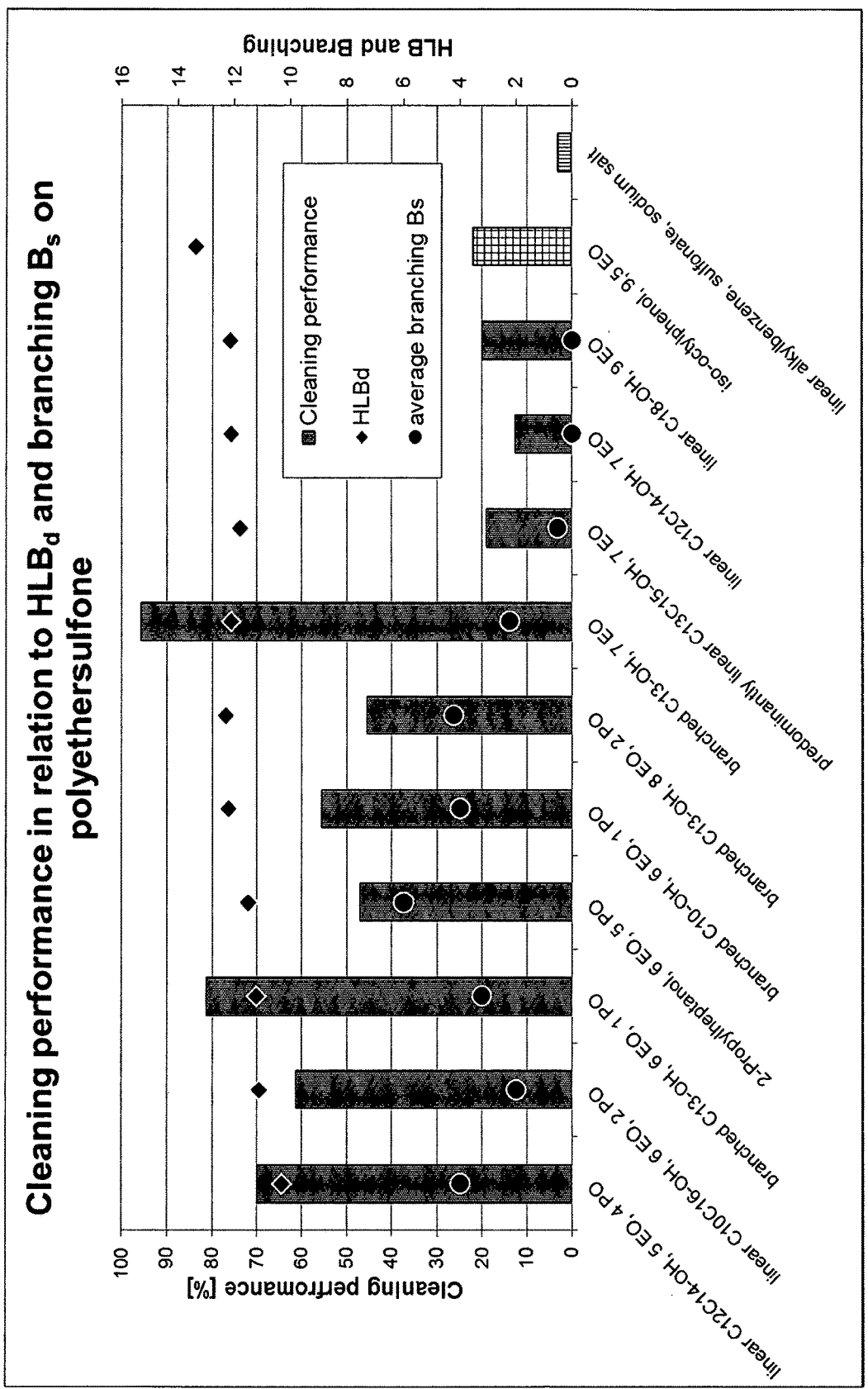
FIG. 9 shows cleaning performance in relation to $HLB_d$ and branching $B_s$ on polyethersulfone.
Figure 10:
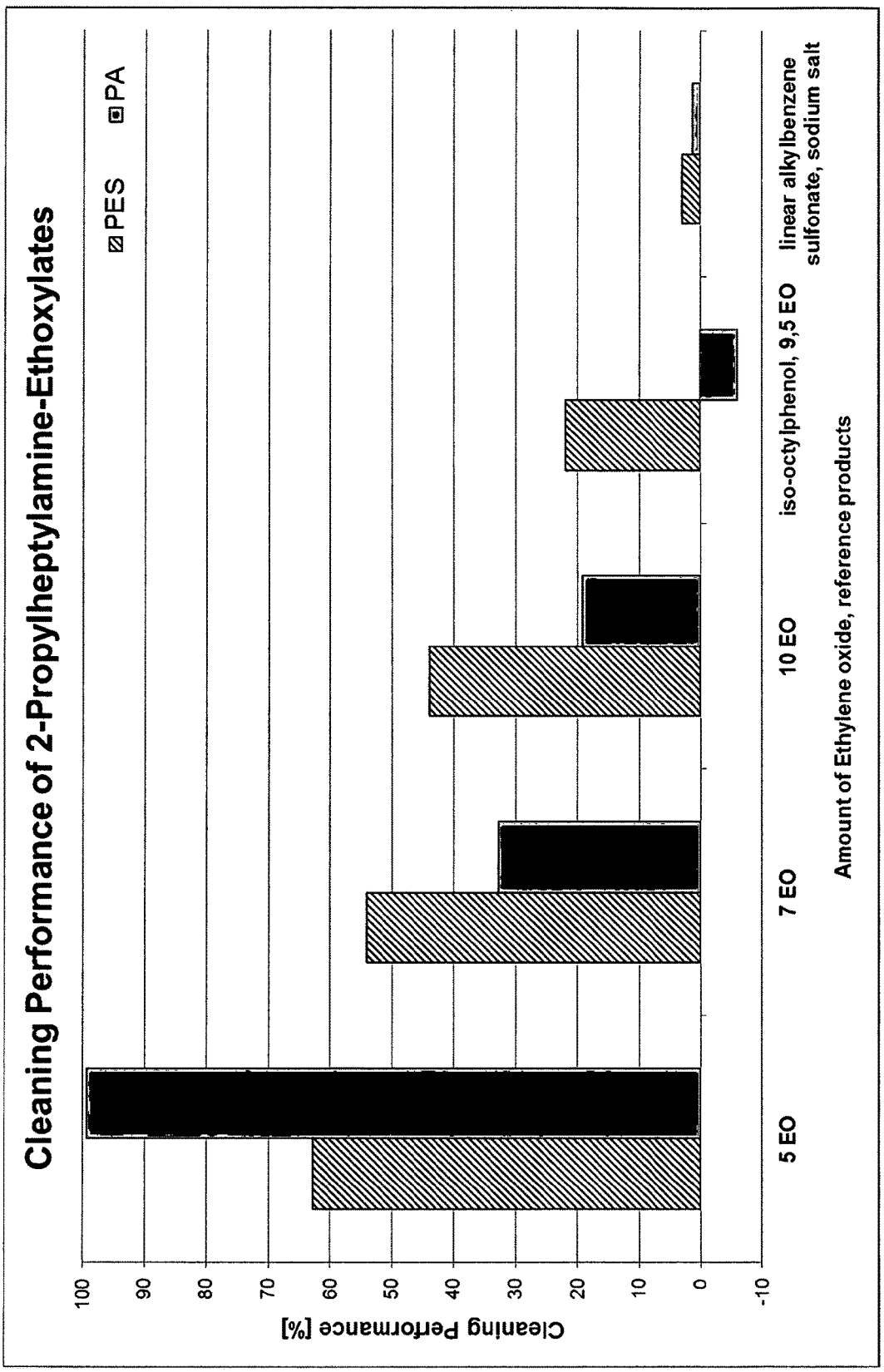
FIG. 10 shows cleaning performance of 2-propylheptylamine-ethoxylates.
Figure 11:
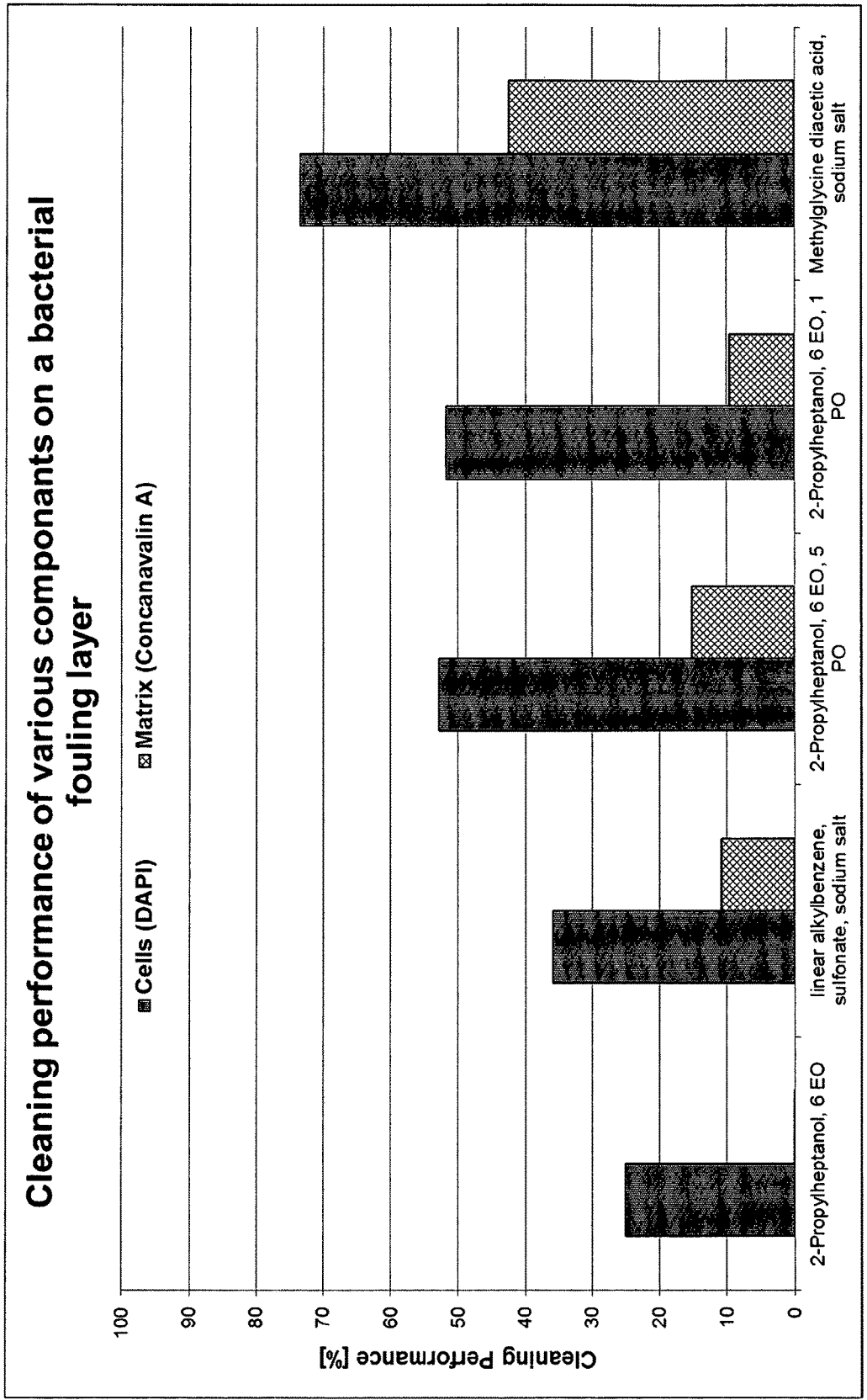
FIG. 11 shows cleaning performance of various components on a bacterial fouling layer.
Figure 12:
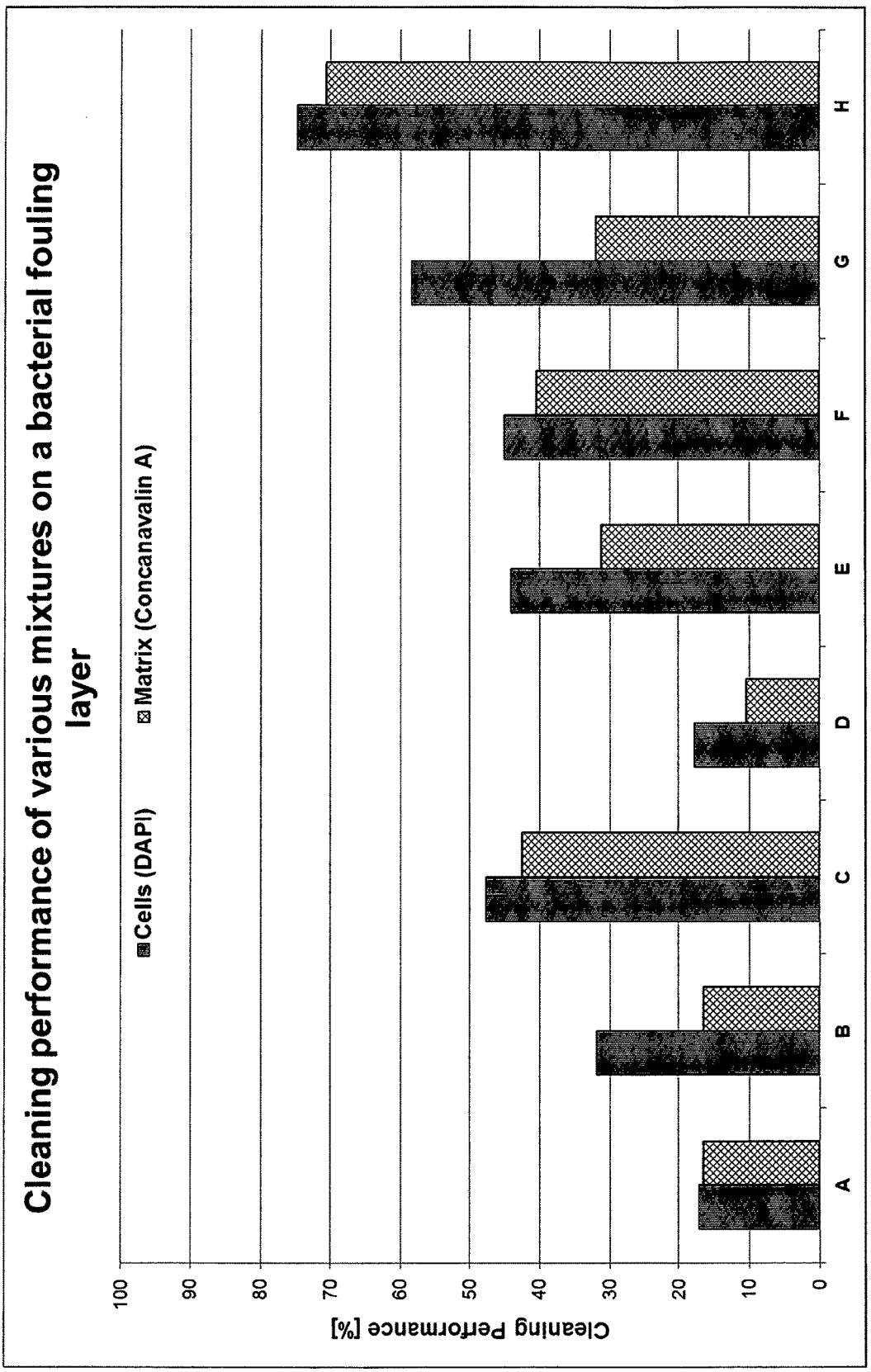
FIG. 12 shows cleaning performance of various mixtures on a bacterial fouling layer.

It has surprisingly been found that alkoxylated non-ionic surfactants represented in formula (I) and having an $HLB_d$ value of from 9 to 12.5 and an average degree of branching 1.5, preferably 2, when used as additive to aqueous membrane cleaning compositions, provide excellent results in terms of cleaning performance and cleaning speed of the membrane and at the same time have a reduced affinity with the membrane surface and a low foaming profile.

Said non-ionic surfactants have the following formula (I):

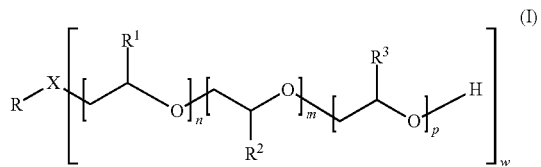

R is a linear or branched $C_8$-$C_{18}$ hydrocarbon chain,
X is O or N,
w is 1 if X is O, w is 2 if X is N,
$R^1$, $R^2$ and $R^3$ independently of one another are hydrogen, methyl, ethyl, propyl, isopropyl, or a mixture of these and preferably n has a value of from 1 to 8, most preferably n has a value of from 1 to 6.

Preferably m has a value of from 1 to 8, most preferably m has a value of from 2 to 6.

Preferably p has a value of from 0 to 8, most preferably p has a value of from 1 to 6.

Preferably the surfactants used according to the invention have a calculated $HLB_d$ value from 9 to 12.5 and an average degree of branching $B_s$ 1.5, preferably $B_s$ 2.

Average Degree of Branching

The degree of branching of the fatty alcohols is defined as a number of carbon atoms in aliphatic hydrocarbon (3° carbon atoms) which are bonded to three additional carbon atoms, plus two times a number of carbon atoms (4° carbon atoms) which are bonded to four additional carbon atoms. The average degree of branching $B_h$ is calculated as a sum of all degrees of branching of individual aliphatic hydrocarbon molecules divided by a total number of the individual aliphatic hydrocarbon molecules.

$$B_h = n*C(3°) + 2*m*C(4°)$$

The degree of branching in the alkyleneoxy chain is defined as a number of carbon atoms (3° carbon atoms) which are bonded to three additional atoms other than hydrogen, plus two times a number of carbon atoms (4° carbon atoms) which are bonded to four additional atoms other than hydrogen. The average degree of branching $B_a$ is calculated as a sum of all degrees of branching of individual alkyleneoxy molecules divided by a total number of the individual alkyleneoxy molecules.

$$B_a = p*C(3°) + 2*q*C(4°)$$

As a further definition, a tertiary amine moiety ($NR_3$) has a branching degree of 1 ($B_N=1$). The average degree of branching of the surfactants $B_s$ is the sum of the average degree of branching of the hydrocarbon part $B_h$ and the branching resulting from the amount of alkyleneoxy groups $B_a$ and, if present, the branching of the tertiary amine moiety $B_N$:

$$B_s = B_h + B_a + B_N$$

The degree of branching may be determined, for example, through use of $^{13}C$ NMR methods such as COSY, DEPT, INADEQUATE, followed by quantification via use of relaxation reagents. Other NMR methods and GCMS methods may also be used.

The surfactants used in the instant invention has an average degree of branching $B_s \geq 1.5$, preferably $B_s \geq 2$.

Preferably the non-ionic surfactants used according to the invention are ethoxylated and/or propoxylated.

In one embodiment of the invention, according to formula (I), $R^1$ is methyl, $R^2$ is hydrogen, $R^3$ is hydrogen or methyl.

In another embodiment of the invention, according to formula (I), $R^1$ is hydrogen, $R^2$ is methyl, $R^3$ is hydrogen or methyl.

Preferred alkoxylated surfactants used in the membrane cleaning composition are depicted in Figure (II) and include 2-propylheptyl mixed ethoxylated and propoxylated fatty alcohols, wherein according to formula (I) R is 2-propylheptyl and X is O

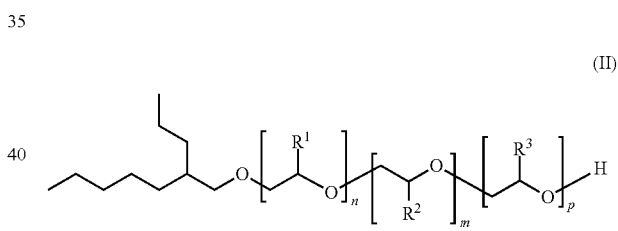

Preferably n has a value of from 1 to 6.
Preferably m has a value of from 1 to 6.
Preferably p has a value of from 0 to 6, most preferably p has a value of from 1 to 6.

Further preferred alkoxylated surfactants used in the membrane cleaning composition include branched fatty alcohol alkoxylates, wherein the surfactant has the following formula Formula (III)

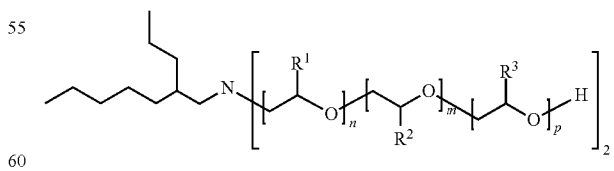

wherein according to formula (I) R is 2-propylheptyl and X is N,
Preferably n has a value of from 1 to 6.
Preferably m has a value of from 1 to 6.
Preferably p has a value of from 0 to 6, most preferably p has a value of from 1 to 6.

Further preferred alkoxylated surfactants used in the membrane cleaning composition include branched fatty alcohol alkoxylates according to Formula (I), wherein
R is a branched alkyl chain having 13 carbon atoms,
X is O.

As known in the art, the calculated HLB of a surfactant is a measure of the degree to which it is hydrophilic or lipophilic, as determined through the Griffin's equation (W. C. Griffin, J. Soc. Cosmet. Chem. 1, 311 (1950); 5, 249 (1954)—see also H. Mollet et al, "Formulation Technology", 1st ed, Wiley-VCH Verlags GmbH, Weinheim 2001, pages 70-73):

$$HLB = 20 * \left(1 - \frac{M_{hydrophobe}}{M_{total}}\right)$$

wherein $M_{hydrophobe}$ is the average molecular weight of the hydrophobic part and $M_{total}$ is the total average molecular weight of the surfactant molecule. As such, the calculated HLB value is essentially a proxy for the ratio of hydrophilic ethyleneoxy groups to the hydophobic alkyl and/or aryl group in the surfactant. Griffin's equation is originally only valid for ethoxylates and not for alkoxylates. As propyleneoxy groups in a nonionic surfactant are neither purely hydrophobic nor purely hydrophilic, we defined the $HLB_d$ of the alkoxylates as such:

$$HLB_d = 20 * \left(1 - \frac{M^d_{hydrophobe}}{M_{total}}\right)$$

wherein $M_{hydrophobe}^d$ is the average molecular weight of the alkyl chain plus half the average molecular weight of the propyleneoxy groups and $M_{total}$ is the total average molecular weight of the surfactant molecule.

The surfactant used in the instant invention has a calculated $HLB_d$ of from 9 to 12.5.

The alcohol alkoxylates were synthesised as described in EP1675811, the narrow range alkoxylates according to the description in US 2005/0215452 A1, the amine alkoxylates according to the description in US 2011/0177945 A1.

The tridecylethoxylates were manufactured according to EP1675811. Tridecylalcohol (Isotridecanol N from BASF SE, resulting from the oxo-process of dodecen, which results from the trimerisation of butene) was ethoxylated under alkaline conditions (KOH) to the corresponding ethoxylates. These tridecylethoxylates have an excellent environmental profile (see Kaluza, U. and K. Taeger. 1996. Einfluss der chemischen Struktur auf ökotoxikologische Eigenschaften von AlkanolEthoxylaten (Effect of chemical structure on the ecotoxicological properties of alcanol ethoxylates). Tenside Surfactants Detergents, 33, 46-51.)

The 2-propylheptanolethoxylates were manufactured accordingly, whereby the used technical grade of 2-propylheptanol consists of 70 to 99% by weight of 2-propylheptanol and 1 to 30% by weight of 2-propyl-4-methylhexanol and/or 2-propyl-5-methylhexanol. The 2-propylheptylaminebased surfactant was manufactured from the above described 2-propylheptanol.

Preferred alkoxylated surfactants used in membrane cleaning compositions include 2-propylheptyl mixed ethoxylated and propoxylated fatty alcohols, wherein the number of ethylene oxide substituents has an average value of 6 and the number of propylene oxide substituents has an average value of 1 or 5.

In another embodiment of the present invention, the branched non-ionic surfactant used as an additive for membrane cleaning compositions has an $HLB_d$ value of from 10 to 12.5 and is an ethoxylated branched tridecanol comprising between 5 and 7 ethylene oxide groups.

In a preferred embodiment, the concentration of surfactants according to the invention in the used membrane cleaning composition is 100 ppm to 10 wt %, preferably 1000 ppm to 5 wt %.

Aqueous membrane cleaning compositions may contain further compounds such as ionic surfactants selected from the group consisting of anionic, cationic, amphoteric, zwitterionic surfactants and/or mixtures thereof, present in the composition at a concentration of 0% to 20 wt %, preferably from 3 wt % to 15 wt %, even more preferably from 5 wt % to 12 wt %.

Further compounds which might be present in the membrane cleaning composition are disinfectants, acids, bases, builders, chelating agents, enzymes, enzyme stabilisers, biocides, hydrotropes, thickeners, oxidising agents, reducing agents.

Ionic Surfactants

Examples of anionic surfactants are: carboxylates, sulfonates, sulfo fatty acid methylesters, sulfates, phosphates. Examples for cationic surfactants are: quartery ammonium compounds. Examples for zwitterionic surfactants are: betaines or amineoxides.

A "carboxylate" is a compound, which comprises at least one carboxylate-group in the molecule. Examples of carboxylates, which can be used according to the present invention, are soaps such as stearates, oleates, cocoates of alkali metals or of ammonium and ethercarboxylates.

A "sulfonate" is a compound, which comprises at least one sulfonate-group in the molecule. Examples of sulfonates, which can be used according to the invention, are alkyl benzene sulfonates, alkyl sulfonates, sulfonated oils, olefine sulfonates, aromatic sulfonates.

A "sulfo fatty acid methylester" is a compound, having the following general formula (I):

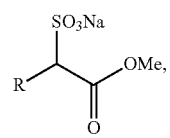

wherein R has 6 to 20 C-atoms; preferably 10 to 18 and particularly preferred 14 to 16 C-atoms.

A "sulfate" is a compound, which comprises at least one $SO_4$-group in the molecule. Examples of sulfates, which can be used according to the present invention, are fatty acid alcohol sulfates such as coca fatty alcohol sulfate (CAS 97375-27-4), other alcohol sulfates, coco fatty alcohol ethersulfates, other alcohol ethersulfates.

A "phosphate" is a compound, which comprises at least one $PO_4$-group. Examples of phosphates, which can be used according to the present invention, are alkyl ether phosphates, phosphates, mono- and dialkyl phosphates.

When producing the chemical composition of the present invention the anionic surfactants are preferably added as salts. Acceptable salts are e.g. alkali metal salts, such as sodium-, potassium- and lithium salts, and ammonium salts, such as mono(hydroxyethyl) ammonium-, di(hydroxyethyl) ammonium- and tri(hydroxyethyl)ammonium salts.

One group of the cationic surfactants are the quartery ammonium compounds.

A "quartery ammonium compound" is a compound, which comprises at least one $R_4N^+$-group per molecule. Examples of counter ions, which are useful in the quartery ammonium compounds, are halogens, methosulfates, sulfates and carbonates of coca fat-, sebaceous fat- or cetyl/oleyltrimethylammonium.

Particularly suitable cationic surfactants are esterquats, especially mono-, di- and trialkanolamines, esterified by $C_8$-$C_{22}$-carbonic acids and subsequently quarternised with alkylating agents, imidazoliniumquats, especially 1-alkylimidazolinium salts.

A betain is a surfactant, which comprises at least one cationic and at least one anionic unit per molecule. An example of a betains, which can be used according to the invention, is cocamidopropylbetaine.

An amineoxide is a surfactant, which comprises at least one N—O unit, an example of an amineoxide is an alkyl dimethyl amineoxide.

Adjuvants

Biocides can be: oxidation agents, halogens such as chlorine and iodine and substances, which release the same, alcohols such as ethanol, 1-propanol and 2-propanol, aldehydes, such as formaldehyde, glutaraldehyde, glyoxal, phenoles, ethylene oxide, chlorohexidine and mecetroniummetilsulfate.

The advantage of using biocides is that pathogenic germs can hardly grow. Pathogenic germs can be: bacteria, spores, fungi and viruses.

Acids are compounds that can advantageously be used to solve or to avoid scaling. Non-limiting examples of acids are formic acid, acetic acid, citric acid, hydrochloric acid, sulfuric acid and sulfonic acids, like methanesulfonic acid.

Bases are compounds, which are useful for adjusting a preferable pH-range for complexing agents. Examples of bases, which can be used according to the present invention, are: NaOH, KOH and aminoethanol.

Reducing agents are compounds, which are useful to eliminate residues of the oxidising agents, an example is sodium hydrosulfite.

As inorganic builder the following are especially useful:
- crystalline and amorphous alumo silicates having ion exchanging properties, such as zeolites: different types of zeolites are useful, especially those of type A, X, B, P, MAP and HS in their Na-modification or in modifications in which Na is partially substituted by other cat ions such as Li, K, Ca, Mg or ammonium;
- crystalline silicates, such as disilicates and layer-silicates, e.g. δ and β $Na_2Si_2O_5$. The silicates can be used as alkali metal-, earth alkali metal- or ammonium salts, the Na-, Li- and Mg-silicates are preferred;
- amorphous silicates, such as sodium metasilicate and amorphous disilicate;
- carbonates and hydrogencarbonates: These can be used as alkali metal-, earth alkali metal- or ammonium salts. Na-, Li- and Mg-carbonates and -hydrogen carbonate, especially sodium carbonate and/or sodium hydrogen carbonate are preferred;
- polyphosphates, such as pentanatriumtriphosphate, sodium tripolyphosphate;
- phosphonates, Useful as oligomeric and polymeric cobuilders are:

Oligomeric and polymeric carbonic acids, such as homopolymers of acrylic acid and aspartic acid, oligomaleic acid, copolymers of maleic acid and acrylic acid, methacrylic acid or $C_2$-$C_{22}$-olefines, e.g. isobutene or long chain a olefines, vinyl-C1-$C_8$-alkylether, vinylacetate, vinylpropionate, (meth)acryl acid ester of C1-$C_8$-alcohols and styrene. Preferred are the homopolymers of acrylic acid and the copolymers of acrylic acid with maleic acid. The oligomeric and polymeric carbonic acids preferably are used as acids or as sodium salts.

Chelating agents are compounds, which can bind cations. They can be used to reduce water hardness and to chelate heavy metals. Examples of chelating agent are: NTA, EDTA, MGDA, DTPA, DTPMP, IDS, HEDP, β-ADA, GLDA, citric acid, oxodisuccinic acid and butanetetracarbonic acid. The advantage of the use of these compounds lies in the fact that many compounds, which serve as cleaning agents, are more active in soft water. In addition to that scaling can be reduced or even be avoided.

Useful enzymes are e.g. proteases, lipases, amylases, cellulases, mannanases, oxidases and peroxidases, polysaccaridases.

Hydrotropes are compounds which enhance the solubility of the surfactant/the surfactants in the chemical composition. An example is: cumene sulfonate.

Thickeners are compounds, which enhance the viscosity of the chemical composition. Non-limiting examples of thickeners are: polyacrylates and hydrophobically modified polyacrylates, polyurethanes, xanthan gums, bentonites. The advantage of the use of thickeners is, that liquids having a higher viscosity have a longer residence time on the surface to be treated in the cases this surface is inclined or even vertical. This leads to an enhanced time of interaction.

Membranes

Typical membrane materials are polysulfone, polyethersulfone, polyamide, polyacrylonitrile, polyvinylidene difluoride, polyimide.

The membrane is composed of a polymer selected from the group consisting of a polyester, polysulfone, polycarbonate, polypropylene, polyamide (PA) and polyether sulfone (PES). Polyolefins, such as polypropylene can be polymers formed from at least one olefin monomer or from at least one olefin monomer and maleic monomer. Examples of polyolefines are low-density polyethylene (LDPE), high-density polyethylene (HDPE), polypropylene (PP), biaxially orientated polypropylene (BOPP), polybutadiene, polytetrafluoroethylene (Teflon-PTFE), chlorinated polyethylene and isopropylene-maleic anhydride copolymer.

Polyamides can be polymers formed from at least one monomer having an amide group or an amino as well as a carboxy group or from at least one monomer having two amino groups and at least one monomer having two carboxy groups. An example of a monomer having an amide group is caprolactam. An example of a diamine is 1,6-diaminohexane. Examples of dicarboxylic acids are adipic acid, terephthalic acid, isophthalic acid and 1,4-naphthalenedicarboxylic acid. Examples of polyamides are polyhexamethylene adipamide and polycaprolactam.

Polyesters can be polymers formed from at least one monomer having a hydroxy as well as a carboxy group or from at least one monomer having two hydroxy groups and at least one monomer having two carboxy groups or a lactone group. An example of a monomer having a hydroxy as well as a carboxy group is adipic acid. An example of a diol is ethylene glycol. An example of a monomer having a lactone group is carprolactone.

Examples of dicarboxylic acids are terephthalic acid, isophthalic acid and 1,4-naphthalenedicarboxylic acid. An example of a polyester is polyethylene terephthalate (PET). So-called alkyd resins are also regarded to belong to polyester polymers. Examples of polycarbonates are poly(aromatic carbonates) and poly(aliphatic carbonates). Poly(aliphatic carbonates) can be formed from carbon dioxide and at least one epoxide. Examples of sulfone-based polymers are polyarylsulfone, polyethersulfone (PES), polyphenylsulfone (PPS) and polysulfone (PSF). Polysulfone (PSF) is a polymer formed from 4,4-dichlorodiphenyl sulfone and bisphenol A.

A further object of the present invention is to provide a process for removing soil from a membrane. A typical process for cleaning membranes consists of following steps: (Hydranautics Technical Service Bulletin October 2011 TSB107.21)
Prewash with water
Circulation with cleaning solution
Soaking
High-flow pumping
Flush out
The inventive process comprises the steps of
i) prewashing the membrane with water,
ii) circulating on the membrane an aqueous membrane cleaning composition comprising a non-ionic surfactant, wherein the surfactant has an $HLB_d$ value of from 9 to 12.5 and an average degree of branching $B_s \geq 1.5$ and wherein the surfactant has the following formula:

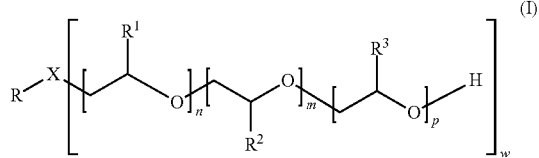

wherein
R is a $C_8$-$C_{18}$ linear or branched hydrocarbon chain,
X is O or N,
$R^1$, $R^2$ and $R^3$ independently of one another are hydrogen, methyl, ethyl, propyl, isopropyl, or a mixture of these,
n has a value of from 1 to 8,
m has a value of from 1 to 8,
p has a value of from 0 to 8, and
w is 1 if X is O, w is 2 if X is N;
iii) soaking the membrane with the membrane cleaning composition,
iv) optionally high-flow pumping
v) flushing the membrane cleaning composition out.

The whole process can be repeated with various cleaning solutions, depending on the fouling, preferably twice and up to five times. Each cleaning take up to 12 hours, depending on the amount and type of fouling.

Examples

Polyamide Thin Film Preparation (PA-Layer)

Freshly cleaned planar silicon oxide carrier materials (silicon wafers 15×20 mm, GESIM, Germany or $SiO_2$ coated QCM-D crystals, Q-sense, Sweden) or glass slides (24×24 mm, Menzel-Glaser, Braunschweig, Germany) were oxidized in a mixture of aqueous ammonia solution (Acros Organics, Geel, Belgium) and hydrogen peroxide (Merck, Darmstadt, Germany) before they were subjected to hydrophobization with hexamethyldisilazane (ABCR, Karlsruhe, Germany). Subsequently thin films of polyamide were immobilized applying spincoating from PA-12 solutions (VESTAMID®• L2101 F, Evonik Industries, Germany). Solutions of 0.2% of VESTAMID were dissolved in hexafluoroisopropanol (Fluka, Germany) and subsequently spincoated at 4000 rpm for 30 s (RC 5 Suess Microtec, Garching, Germany). The polyamide thin films showed a thickness of 25±2 nm (ellipsometry, SE 400, Sentech, Berlin, Germany).

Poly(Ethersulfone) Thin Film Preparation (PES-Layer)

Freshly cleaned planar silicon oxide carrier materials (silicon wafers 15×20 mm, GESIM, Germany or $SiO_2$-coated QCM-D crystals, Q-sense, Sweden) or glass slides (24×24 mm, Menzel-Glaser, Braunschweig, Germany) were oxidized in a mixture of aqueous ammonia solution (Acros Organics, Geel, Belgium) and hydrogen peroxide (Merck, Darmstadt, Germany) before they were subjected to hydrophobization with hexamethyldisilazane (ABCR, Karlsruhe, Germany). Subsequently thin films of Polyethersulfon were immobilized applying spincoating from PES solutions (Ultrason PES Type E 6020 P, BASF SE, Germany). Solutions of 0.3% of Ultrason PES were dissolved in dichloromethane (Acros Organics, Germany) and subsequently spincoated at 4000 rpm for 30 s (RC 5 Suess Microtec, Garching, Germany). The ultrason layers thin films showed a thickness of 30±2 nm (ellipsometry, SE 400, Sentech, Berlin, Germany).

Surfactant (Cleaning Agent) Adsorption by Quartz Crystal Microbalance (QCM)

Adsorption of surfactants on poly(amide) and poly(ethersulfone) thin films was analyzed at constant temperature (23° C.) by using QCM-E4 (Q-Sense AB, Gothenburg, Sweden). The polymer-coated QCM crystals were swollen in deionised water to achieve a stable baseline and subsequently incubated with different surfactants dissolved in deionised water (0.025% active). Stability/desorption of the resulting single component layer was evaluated by rinsing with deionised water. Frequency and dissipation shifts induced by adsorbed/desorbed components were used to determine changes in surface concentration of the surfactants.

Preparation of BSA/Alginate/Humic Acid (Marine) Fouling Layers (PA)

Fouling layers were generated by directly covering the PA thin film substrate prepared on silicon oxide carrier materials with a solution of 0.25% alginate (AG; medium viscosity, Sigma-Aldrich), 200 ppm bovine serum albumin (BSA; Sigma-Aldrich) and 20 ppm humic acid (HA; Sigma-Aldrich). After 10 min adsorption, the excess liquid was removed by carefully tilting the wafers followed by a subsequent drying step at 60° C. for 5 min. The molecular fouling layers were stabilized by dipping them into a concentrated CaCl2 (Merck) solution (8% [w/v]) for 10 sec followed by an additional drying step at room temperature. After rinsing with MilliQ, this type of layers was used for all subsequent cleaning experiments. Prior to the cleaning experiments, all molecular fouling layers were dipped in MilliQ for 1 min and dried at room temperature. Resulting layer thickness was analyzed by ellipsometry.

Preparation of Lactalbumin/Casein (Milk) Fouling Layers (PES)

Fouling layers were prepared by dipping PES thin film substrates into an excess volume of 0.1% [w/w] α-Lactalbumin (LA, Sigma-Aldrich) and 1% Casein (CA, soluble in alkali, Merck) dissolved in MilliQ. The substrates were taken out and adsorption of the liquid layer remaining on the top was performed at 60° C. for 2 min. After that, the excess liquid was discarded and the substrates were dried at 60° C. for 30 min. To stabilize the layers, the dried substrates were dipped into a concentrated CaCl2 solution (8% [w/w]) for 10 sec followed by an additional drying step at room temperature. This type of layers was used for all subsequent cleaning experiments. Prior to the cleaning experiments, all molecular fouling layers were dipped in hard water (16° dH, pH 8) for 1 min and dried at room temperature. Resulting layer thickness was analyzed by ellipsometry.

Evaluation of Cleaning Efficiency

Selected cleaning conditions (alkaline pH) and agents (surfactants) were tested for their potential to decrease the thickness of multi-component fouling layers. Unless otherwise indicated, all substances were dissolved in deionised water (pH 12) with an active concentration of 0.025% for cleaning of BSA/AG/HA layers on PA surfaces. For cleaning of LA/CA-layers (milk proteins) on PES-surfaces an active concentration of 0.025% at pH 8 in hard water (16° dH) was used. The biofouling model layers were immersed in aqueous solutions containing the selected agents for 10 min at room temperature followed by rinsing in deionised water and drying at room temperature. Remaining layer thickness was determined by ellipsometry. Cleaning efficiency was calculated according to the formula cleaning efficiency=[1-(remaining layer thickness/initial layer thickness)]*100%.

Determination of Layer Thickness by Ellipsometry

Layer thickness was determined using a micro-focus ellipsometer Sentech SE-400 from Sentech Instruments GmbH, Germany with a wavelength of $\Lambda$=632.8 nm. The angle of incidence was set to 65, 70 and 75°. For further thickness measurements a multilayer model was applied to calculate the thickness of the fouling layers and the underlying polyamide thin films. The refractive indices were: $n_{(Si)}$=3.858; $n_{(SiO2)}$=1.4571; $n_{(Polyamide\ or\ Polyethersulfone)}$=1.50 and $n_{(fouling\ layer)}$=1.47. All data are presented as mean values.

2. Bacterial Fouling Layers

Bacterial Strain and Growth Conditions

To generate bacterial fouling layers, the marine bacterium *Cobetia marina* (DSMZ4741) was used in this study. The strain was purchased from the DSMZ culture collections, Germany. Sea Salt Peptone (SSP, all ingredients purchased from Sigma-Aldrich) (sea salt 20 g; peptone 18 g; deionised water 1,000 ml, pH 7.8) was used as the growth medium. The culture stock was maintained on Sea Salt Peptone Agar (SSPA, all ingredients purchased from Sigma-Aldrich) slants (sea salt 20 g; peptone 18 g; agar 30 g; deionised water 1,000 ml, pH 7.8). Prior to the experiments, the culture was grown in the SSP medium on a rotary shaker at 180 rpm at 28° C. for 20-22 h in order to obtain cells in the logphase.

Preparation of Bacterial Fouling Layers

The polyamid thin film substrates prepared on glass slides were conditioned for 24 h in artificial seawater (sea salt 20 g; deionised water 1,000 ml, pH 7.8) before being transferred to the bacterial cell suspensions. A freshly grown (logphase) bacterial suspension was prepared with an absorbance of 0.2 at a wavelength of 600 nm (DU 800, Beckman Coulter, Krefeld, Germany). The conditioned replicate slides (four for each assay) were placed into individual compartments of quadric petri dishes and 5 ml of the bacterial suspension was added thereby fully immersing the slides. The plates were placed in an incubator at 28° C. on a rotary shaker (90 rpm). After 1 h of incubation, the slides were transferred into new quadric petri dishes containing 5 ml of fresh SSP medium. The plates were incubated for another 4 h at 28° C. on a rotary shaker (90 rpm) for the attached bacteria to proliferate on the surface of the slides. At the end of the incubation, the slides were gently rinsed in artificial seawater to remove any non-adherent cells.

Cleaning Experiments with Bacterial Fouling Layers

Similar to the experiments using the multi-component molecular fouling layers, selected cleaning conditions (pH 12) and agents were tested for their ability to remove bacterial cells and EPS matrix. Additionally, the cleaning potential of the protease subtilisin (Subtilisin A type VIII from *Bacillus licheniformis*, 12 U/mg, Sigma-Aldrich) and methylglycine diacetic acid, sodium salt (Trition• M liquid, BASF SE) applied alone or in combination with the surfactant 2-propylheptanol, 6 EO, 1 PO (Lutensol• XL 60, BASF SE) was evaluated. For that, the enzyme (100 µg/ml) and/or chelating agent (active concentration of 0.2%) and/or the surfactant (active concentration of 0.025%) were dissolved in 10 mM $NaH_2PO_4$ buffer (Sigma-Aldrich, pH 8.1). The bacterial fouling layers were immersed in the particular cleaning solution for 10 min at room temperature followed by rinsing in deionised water. After that, they were immediately fixed.

Fixation and Staining

For fluorescence microscopy/spectroscopy and atomic force microscopy, bacterial fouling layers were fixed by transferring the respective slides into quadric petri dishes containing 4% paraformaldehyde (Sigma-Aldrich). After incubation for 15 min, the layers were rinsed with deionised water and dried by nitrogen.

For fluorescence staining, the slides were placed into custom-made incubation chambers in order to avoid backside staining. To stain the EPS matrix, Alexa 488-conjugated Concanavalin A (Molecular Probes, distributed by Invitrogen, Netherlands) dissolved in 0.1 M sodium bicarbonate (SigmaAldrich) buffer (pH 8.3) was added for 1 h in the dark (25 µg/cm$^2$). After incubation, the solution was removed and samples were washed with phosphate buffered saline (PBS, Sigma-Aldrich) twice. For staining of bacterial cells, DAPI solution (dissolved in PBS) was applied to Concanavalin A-stained samples for 5 min in the dark (25 µg/cm$^2$). After removal of the solution, the layers were washed with deionised water twice. Samples were taken out of the incubation chambers and dried by nitrogen.

For scanning electron microscopy, an alternative fixation procedure was performed to allow for optimized EPS visualization. Therefore, the samples were washed in PBS and fixed in 0.1M cacodylate buffer pH 7.3 containing 2% paraformaldehyde, 2% glutaraldehyde and 0.2% ruthenium red for 1 hr at room temperature. Rinsing for 30 min in 0.1M cacodylate buffer containing 7.5% sucrose and 0.1% ruthenium red was followed by postfixation in 0.1 M cacodylate buffer containing 1% osmiumtetroxide and 0.05% ruthenium red (all reagents Sigma, Germany; OsO4 by Roth, Germany). Next, the samples were washed in deionised water and critical point dried (BAL-TEC CPD 030, BalTec, Liechtenstein), sputtered with gold (Sputtercoater, BAL-TEC) and visualized using the FEI XL 30 scanning electron microscope.

Morphological Analysis of Bacterial Fouling Layers

After fixation, the morphology of the bacterial fouling layers was analyzed by microscopy. Fluorescently stained samples were evaluated by fluorescence microscopy (DMIRE2, Leica, Bensheim, Germany) using a 100× oil objective. Thereby, DAPI fluorescence was monitored with an excitation wavelength of 360 nm and an emission wavelength of 460 nm, while for Alexa 488-conjugated Concanavalin A, an excitation wavelength of 492 nm and an emission wavelength of 520 nm was used. Both images were combined to generate an overlay picture.

For analysis of the bacterial fouling layer morphology at a higher resolution, atomic force microscopy (AFM) and scanning electron microscopy (SEM) were used. AFM imaging was performed on air dried samples using a JPK Nanowizard AFM (JPK Instruments, Germany) mounted on an Axiovert Observer D.1 inverted optical microscope (Zeiss, Germany). AFM cantilevers used had a nominal spring constant of 60 mN/m (SNL, Bruker). Feedback gains were optimized to get the best resolution of the topographs. Topographs were recorded at a line rate of 1.5 Hz in constant force contact mode, maintaining a contact force of »200 pN throughout the measurement. The SEM measurements were done on gold coated samples utilizing an XL 30 ESEM (FEI, Netherlands) electron microscope in high-vacuum mode applying a voltage of 5-10 kV.

Quantification of Cleaning Efficiency by Fluorescence Spectroscopy

Fluorescently stained samples were placed into a custom-made slide holder. Fluorescence of DAPI and Alexa 488-conjugated Concanavalin A was measured in a plate reader (SPECTROFluor multiwell plate reader of TECAN GENios, Magellan software, Crailsheim, Germany) with the top mode using three flashes. The plate reader method was programmed to counterfeit the 6-well flat bottom plates thereby resulting in a total number of 16 measurement points across each slide. The average number of these points was used to determine the relative bacterial biomass and EPS matrix attached to the surface after subtraction of the blank.

As a blank, a polyimide slide was used, which had been exposed to the same conditions, but in the absence of bacteria. For evaluation of cleaning efficiency, the fluorescence intensity of the particular samples was compared to that of untreated slides thereby representing the originally deposited biofilm.

Determination of the Dynamic Contact Angle

The dynamic contact angle was measured with a video based high velocity measuring instrument for contact angle determination of the type OCAH 200 of the company Dataphysics Instruments 5 GmbH, Raiffeisenstr. 34, Fildersradt, on the spin-coated glass slides.

The surfactants according to the invention listed in Tables 1 to bare used in an aqueous solution at a concentration of 0.2 g/l.

The contact angel is constantly determined (60 times per second) at 23° C. during 10 seconds after application. Under these conditions the contact angel of water without added surfactant remains at approximately at 65°. The contact angle on PA of the aqueous solutions of the branched tridecylethoxylates drops to 10° to 33°. The contact angle on PES of the aqueous solutions of the branched tridecylethoxylates drops to 17° to 37°. A contact angle after 10 seconds below 30° is preferred.

TABLE 1

Adsorption/desorption behaviour and cleaning performance of branched $C_{13}$ alcohol ethoxylates on polyamide

| | | | Surfactant Layer after | | | | | | |
|---|---|---|---|---|---|---|---|---|---|
| Nr | Starting alcohol | Head group | 4. Adsorption step [ng/cm$^2$] | 4. Desorption step [ng/cm$^2$] | Cleaning Performance [%] | average total $M_W$ | average $M_W$ of the hydrophobe | HLB$_d$ | Average Branching B$_s$ |
| 1 | branched $C_{13}$—OH | 3 EO | 645.0 | 149.1 | 2.8 | 332 | 200 | 8.0 | 2.2 |
| 2 | branched $C_{13}$—OH | 5 EO | 390.7 | 120.6 | 60.0 | 420 | 200 | 10.5 | 2.2 |
| 3 | branched $C_{13}$—OH | 6 EO | 365.7 | 57.9 | 65.0 | 464 | 200 | 11.4 | 2.2 |
| 4 | branched $C_{13}$—OH | 7 EO | 364.8 | 91.2 | 50.9 | 508 | 200 | 12.1 | 2.2 |
| 5 | branched $C_{13}$—OH | 9 EO | 350.8 | 73.2 | 13.3 | 552 | 200 | 12.8 | 2.2 |
| 6 | branched $C_{13}$—OH | 12 EO | 271.6 | 15.4 | 5.5 | 728 | 200 | 14.5 | 2.2 |

TABLE 2

Adsorption/desorption behaviour and cleaning performance of branched $C_{13}$ alcohol ethoxylates on polyethersulfone

| | | | Surfactant Layer after | | | | | | |
|---|---|---|---|---|---|---|---|---|---|
| Nr | Starting alcohol | Head group | 4. Adsorption step [ng/cm$^2$] | 4. Desorption step [ng/cm$^2$] | Cleaning Performance [%] | average total $M_W$ | average $M_W$ of the hydrophobe | HLB$_d$ | average branching B$_s$ |
| 7 | branched $C_{13}$—OH | 3 EO | 593.9 | 138.5 | 81.4 | 332 | 200 | 8.0 | 2.2 |
| 8 | branched $C_{13}$—OH | 5 EO | 494.4 | 184.3 | 87.2 | 420 | 200 | 10.5 | 2.2 |
| 9 | branched $C_{13}$—OH | 6 EO | 441.8 | 138.5 | 99.0 | 464 | 200 | 11.4 | 2.2 |
| 10 | branched $C_{13}$—OH | 7 EO | 306.7 | 54.7 | 95.8 | 508 | 200 | 12.1 | 2.2 |
| 11 | branched $C_{13}$—OH | 9 EO | 297.0 | 61.0 | 72.6 | 552 | 200 | 12.8 | 2.2 |
| 12 | branched $C_{13}$—OH | 12 EO | 267.0 | 44.3 | 69.3 | 728 | 200 | 14.5 | 2.2 |

TABLE 3

Adsorption/desorption behaviour and cleaning performance of 2-propylheptanol alkoxylates on polyamide

| Nr | Starting alcohol | Head group composition | Surfactant Layer after 4. Adsorption step [ng/cm$^2$] | Surfactant Layer after 4. Desorption step [ng/cm$^2$] | Cleaning Performance [%] | average total M$_W$ | average M$_W$ of the hydrophobes | HLB$_d$ | average branching B$_s$ |
|---|---|---|---|---|---|---|---|---|---|
| 13 | 2-Propylheptanol | 3 EO | 471.6 | 176.3 | 10.6 | 290 | 158 | 9.1 | 2 |
| 14 | 2-Propylheptanol | 4 EO, 1 PO | 521.9 | 36.3 | 99.5 | 392 | 216 | 10.5 | 2 |
| 15 | 2-Propylheptanol | 4 EO, 1 PO (narrow range) | 917.1 | 77.0 | 65.3 | 392 | 216 | 10.5 | 2 |
| 16 | 2-Propylheptanol | 5 EO, 1 PO | 283.3 | 8.3 | 89.5 | 436 | 216 | 11.4 | 2 |
| 17 | 2-Propylheptanol | 5 EO, 1 PO (narrow range) | 367.1 | 73.0 | 58.6 | 436 | 216 | 11.4 | 2 |
| 18 | 2-Propylheptanol | 6 EO, 1 PO | 287.7 | 57.8 | 94.7 | 480 | 216 | 12.4 | 2 |
| 19 | 2-Propylheptanol | 7 EO, 1 PO | 259.8 | 50.3 | −3.6 | 524 | 216 | 12.9 | 2 |
| 20 | 2-Propylheptanol | 8 EO, 1 PO | 258.0 | 58.7 | 10.0 | 568 | 216 | 13.4 | 2 |
| 21 | 2-Propylheptanol | 9 EO, 1 PO | 257.6 | 68.6 | −5.7 | 612 | 216 | 13.9 | 2 |
| 22 | 2-Propylheptanol | 6 EO | 136.8 | 16.5 | −1.9 | 422 | 158 | 12.5 | 1 |

TABLE 4

Adsorption/desorption behaviour and cleaning performance of 2-propylheptanol alkoxylates on polyethersulfone

| Nr | Starting alcohol | Head group composition | Surfactant Layer after 4. Adsorption step [ng/cm$^2$] | Surfactant Layer after 4. Desorption step [ng/cm$^2$] | Cleaning Performance [%] | average total M$_W$ | average M$_W$ of the hydrophobe | HLB$_d$ | average branching B$_s$ |
|---|---|---|---|---|---|---|---|---|---|
| 23 | 2-Propylheptanol | 3 EO | | | | 290 | 158 | 9.1 | 2 |
| 24 | 2-Propylheptanol | 4 EO, 1 PO | 428.6 | 105.9 | 58.4 | 392 | 216 | 10.5 | 2 |
| 25 | 2-Propylheptanol | 4 EO, 1 PO (narrow range) | 424.1 | 32.5 | 88.3 | 392 | 216 | 10.5 | 2 |
| 26 | 2-Propylheptanol | 5 EO, 1 PO | 281.0 | 62.6 | 54.5 | 436 | 216 | 11.4 | 2 |
| 27 | 2-Propylheptanol | 5 EO, 1 PO (narrow range) | 397.9 | 56.4 | 69.3 | 436 | 216 | 11.4 | 2 |
| 28 | 2-Propylheptanol | 6 EO, 1 PO | 247.8 | 70.7 | 72.0 | 480 | 216 | 12.4 | 2 |
| 29 | 2-Propylheptanol | 7 EO, 1 PO | 177.7 | 1.9 | 25.4 | 524 | 216 | 12.9 | 2 |
| 30 | 2-Propylheptanol | 8 EO, 1 PO | 183.0 | 58.7 | 11.0 | 568 | 216 | 13.4 | 2 |
| 31 | 2-Propylheptanol | 9 EO, 1 PO | 164.0 | 15.3 | 14.6 | 612 | 216 | 13.9 | 2 |
| 32 | 2-Propylheptanol | 6 EO | 169.5 | 4.2 | 16.0 | 422 | 158 | 12.5 | 1 |

TABLE 5

Adsorption/desorption behaviour and cleaning performance of various alkoxylates on polyamide

| Nr | Starting alcohol | Head group components | Surfactant Layer after 4. Adsorption step [ng/cm$^2$] | Surfactant Layer after 4. Desorption step [ng/cm$^2$] | Cleaning Performance [%] | average total M$_W$ | average M$_W$ of the hydrophobe | HLB$_d$ | average branching B$_s$ |
|---|---|---|---|---|---|---|---|---|---|
| 33 | iso-octylphenol | 9.5 EO | 238.5 | 0.0 | −6.0 | 624 | 206 | 13.4 | |
| 34 | branched C$_{13}$—OH | 8 EO, 2 PO | 269.0 | 20.5 | 51.0 | 668 | 258 | 12.3 | 4.2 |
| 35 | 2-Propylheptanol | 8 EO, 5 PO | 447.0 | 31.5 | 75.0 | 800 | 448 | 8.8 | |
| 35 | 2-Propylheptylamine | 10 EO | 108.3 | 36.5 | 19.3 | 597 | 157 | 14.7 | 2 |
| 36 | branched C$_{10}$—OH | 6 EO, 1 PO | 331.7 | 37.1 | 88.4 | 480 | 187 | 12.2 | 4 |
| 37 | branched C$_{13}$—OH | 6 EO, 1 PO | 301.5 | 45.6 | 100.6 | 522 | 229 | 11.2 | 3.2 |
| 38 | 2-Propylheptanol | 6 EO, 5 PO | 513.0 | 45.6 | 88.8 | 712 | 303 | 11.5 | 6 |
| 39 | linear C$_{10}$C$_{16}$—OH | 6 EO, 2 PO | 330.6 | 79.8 | 66.1 | 580 | 258 | 11.1 | 2 |
| 40 | 2-Propylheptylamine | 5 EO | 279.3 | 120.8 | 99.4 | 377 | 157 | 11.7 | 2 |
| 41 | linear alkylbenzene | sulfonate, sodium salt | 311.2 | 124.3 | 1.3 | | | | |
| 42 | linear C$_{12}$C$_{14}$—OH | 7 EO | 342.6 | 152.8 | 4.2 | 508 | 200 | 12.1 | 0 |
| 43 | 2-Propylheptylamine | 7 EO | 358.0 | 158.5 | 32.7 | 465 | 157 | 13.2 | 2 |
| 44 | linear C$_{12}$C$_{14}$—OH | 5 EO, 4 PO | 471.6 | 176.3 | 26.0 | 652 | 316 | 10.3 | 4 |
| 45 | predominantly linear C$_{13}$C$_{15}$—OH | 7 EO | 411.5 | 278.2 | 31.9 | 522 | 214 | 11.8 | 0.5 |

TABLE 5-continued

Adsorption/desorption behaviour and cleaning performance of various alkoxylates on polyamide

| | | | Surfactant Layer after | | | | | | |
|---|---|---|---|---|---|---|---|---|---|
| Nr | Starting alcohol | Head group components | 4. Adsorption step [ng/cm$^2$] | 4. Desorption step [ng/cm$^2$] | Cleaning Performance [%] | average total $M_W$ | average $M_W$ of the hydrophobe | $HLB_d$ | average branching $B_s$ |
| 46 | linear $C_{18}$—OH | 9 EO | 400.1 | 362.0 | −14.5 | 652 | 256 | 12.1 | 0 |
| 47 | predominantly linear $C_{13}C_{15}$—OH | 5 EO, 2 BuO | 1316.7 | 1037.4 | 0.0 | 578 | 286 | 10.1 | 2.5 |

TABLE 6

Adsorption/desorption behaviour and cleaning performance of various alkoxylates on polyethersulfone

| | | | Surfactant Layer after | | | | | | |
|---|---|---|---|---|---|---|---|---|---|
| Nr | Starting alcohol | Head group components | 4. Adsorption step [ng/cm$^2$] | 4. Desorption step [ng/cm$^2$] | Cleaning Performance [%] | average total $M_W$ | average $M_W$ of the hydrophobe | $HLB_d$ | average branching $B_s$ |
| 48 | linear $C_{12}C_{14}$—OH | 7 EO | 244.9 | 2.3 | 12.5 | 508 | 200 | 12.1 | 0 |
| 49 | iso-octylphenol | 9.5 EO | 211.3 | 19.9 | 22.0 | 624 | 206 | 13.4 | |
| 50 | 2-Propylheptylamine | 5 EO | 199.5 | 22.8 | 62.8 | 377 | 157 | 11.7 | 2 |
| 51 | linear $C_{10}C_{16}$—OH | 6 EO, 2 PO | 323.8 | 35.1 | 61.4 | 580 | 258 | 11.1 | 2 |
| 52 | 2-Propylheptanol | 6 EO, 5 PO | 703.7 | 47.6 | 47.0 | 712 | 303 | 11.5 | 6 |
| 53 | 2-Propylheptylamine | 10 EO | 62.7 | 47.6 | 43.9 | 597 | 157 | 14.7 | 2 |
| 54 | branched $C_{13}$—OH | 8 EO, 2 PO | 275.0 | 51.3 | 45.3 | 668 | 258 | 12.3 | 4.25 |
| 55 | branched $C_{10}$—OH | 6 EO, 1 PO | 262.5 | 62.7 | 55.5 | 480 | 187 | 12.2 | 4 |
| 56 | branched $C_{13}$—OH | 6 EO, 1 PO | 325.5 | 65.0 | 81.3 | 522 | 229 | 11.2 | 3.2 |
| 57 | linear alkylbenzene sulfonate, sodium salt | | 194.9 | 72.6 | 3.0 | | | | |
| 58 | predominantly linear $C_{13}C_{15}$—OH | 7 EO | 315.3 | 87.0 | 19.0 | 522 | 214 | 11.8 | 0.5 |
| 59 | 2-Propylheptylamine | 7 EO | 212.0 | 100.3 | 54.2 | 465 | 157 | 13.2 | 2 |
| 60 | linear $C_{12}C_{14}$—OH | 5 EO, 4 PO | 386.1 | 103.4 | 70.0 | 652 | 316 | 10.3 | 4 |
| 61 | predominantly linear $C_{13}C_{15}$—OH | 5 EO, 2 BuO | 491.3 | 280.4 | | 578 | 286 | 10.1 | 2.5 |
| 62 | linear $C_{18}$—OH | 9 EO | 374.5 | 305.5 | 19.9 | 652 | 256 | 12.1 | 0 |

TABLE 7

Cleaning performance [%] of various alkoxylates on polyamide after immersing 5, 10 and 30 minutes

| Nr. | Product | 5 min | 10 min | 30 min |
|---|---|---|---|---|
| 63 | linear alkylbenzenesulfonate, sodium salt | −2,5 | 1,3 | 0,5 |
| 64 | 2-Propylheptanol, 6 EO, 5 PO | −1,0 | 88,8 | 93,4 |
| 65 | branched $C_{13}$—OH, 7 EO | 0,6 | 50,9 | 94,7 |
| 66 | 2-Propylheptanol, 4 EO, 1 PO | 3,3 | 65,3 | 93,8 |
| 67 | 2-Propylheptanol, 6 EO, 1 PO | 49,9 | 94,7 | 94,1 |
| 68 | 2-Propylheptanol, 3 EO | 3,3 | 10,6 | 9,0 |
| 69 | 2-Propylheptanol, 6 EO | −4,0 | −1,9 | 66,0 |

TABLE 8

Contact angle of branched tridecylethoxylates at 0.1 s, 1 s and 10 s on PES

| Time [s] | Water | 3 EO | 5 EO | 6 EO | 7 EO | 9 EO | 12 EO |
|---|---|---|---|---|---|---|---|
| 0.1 | 65.4° | 59.2° | 53.4° | 49.5° | 45.0° | 55.0° | 49.6° |
| 1.0 | 65.4° | 52.9° | 40.9° | 37.2° | 34.8° | 48.8° | 44.9° |
| 10.0 | 65.3° | 32.7° | 21.0° | 17.9° | 17.9° | 36.4° | 33.8° |

TABLE 9

Contact angle of branched tridecylethoxylates at 0.1 s, 1 s and 10 s on PA

| Time [s] | Water | 3 EO | 5 EO | 6 EO | 7 EO | 9 EO | 12 EO |
|---|---|---|---|---|---|---|---|
| 0.1 | 65.5 | 59.2 | 53.4 | 50.0 | 48.2 | 50.6 | 51.0 |
| 1.0 | 65.4 | 52.9 | 40.9 | 30.5 | 32.3 | 35.3 | 42.7 |
| 10.0 | 65.3 | 32.7 | 21.0 | 10.4 | 10.5 | 18.1 | 31.3 |

TABLE 10

Cleaning performance of various components on a bacterial fouling layer on PA

| Component (0.025%, pH 12) | Cleaning Performance [%] | |
|---|---|---|
| | Cells (DAPI) | Matrix (Concanavalin A) |
| 2-Propylheptanol, 6 EO | 25,1 | 0,2 |
| linear alkylbenzene, sulfonate, sodium salt | 35,9 | 10,8 |
| 2-Propylheptanol, 6 EO, 5 PO | 52,8 | 15,2 |
| 2-Propylheptanol, 6 EO, 1 PO | 51,7 | 9,6 |
| Methylglycine diacetic acid, sodium salt | 73,5 | 42,5 |

TABLE 11

Cleaning performance of various mixtures on a bacterial fouling layer on PA

| Compound | Mixture | Cleaning Performance [%] | |
|---|---|---|---|
| | | Cells (DAPI) | Matrix (Concanavalin A) |
| Buffer pH 8.1 | A | 17,1 | 16,5 |
| 2-Propylheptanol, 6 EO, 1 PO | B | 31,8 | 16,5 |
| Methylglycine diacetic acid, sodium salt | C | 47,7 | 42,5 |
| Subtilisin | D | 17,8 | 10,5 |
| 2-Propylheptanol, 6 EO, 1 PO and Subtilisin | E | 44,2 | 31,2 |
| Methylglycine diacetic acid, sodium salt and Subtilisin | F | 45,1 | 40,4 |
| 2-Propylheptanol, 6 EO, 1 PO and Methylglycine diacetic acid, sodium salt | G | 58,4 | 31,9 |
| 2-Propylheptanol, 6 EO, 1 PO and Methylglycine diacetic acid, sodium salt and Subtilisin | H | 74,8 | 70,6 |

The invention claimed is:

1. An aqueous composition comprising as an additive an alkoxylated non-ionic surfactant, wherein the surfactant has an $HLB_d$ value of from 9 to 12.5 and an average degree of branching $B_s \geq 1.5$ and wherein the surfactant has the following formula

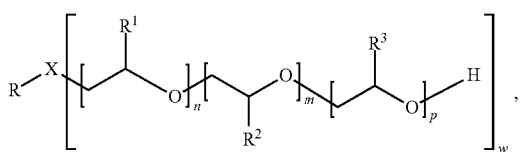

(I)

wherein
R is a $C_8$-$C_{18}$ linear hydrocarbon chain,
X is O or N,
$R^1$ is hydrogen,
$R^2$ and $R^3$ independently of one another are hydrogen, methyl, ethyl, propyl, isopropyl, or a mixture of these,
n has a value of from 1 to 8,
m has a value of from 1 to 8,
p has a value of from 0 to 8, and
w is 1 if X is O, w is 2 if X is N;
wherein the aqueous composition is a membrane cleaning composition.

2. The aqueous composition according to claim 1, wherein the average degree of branching $B_s$ is ≥2.

3. The aqueous composition according to claim 1, wherein $R^1$ is hydrogen, $R^2$ is methyl, $R^3$ is hydrogen or methyl.

4. The aqueous composition according to claim 1, wherein the concentration of surfactants in the used membrane cleaning composition is 100 ppm to 10 wt %.

5. The aqueous composition according to claim 1, wherein the membrane material is polyethersulfone, polyamide, polysulfone or polyvinylidene difluoride.

6. The aqueous composition according to claim 1, wherein the cleaning composition has a pH of 8 to 14.

7. The aqueous composition according to claim 1, wherein the cleaning composition has a pH of 0 to 5.

8. The aqueous composition according to claim 1, wherein the cleaning composition further comprises chelating agents and/or builders and/or cobuilders and/or enzymes.

9. The aqueous composition according to claim 8, where the chelating agent is methyl glycine diacetic acid, sodium salt and/or glutamic acid diacetic acid, sodium salt.

10. The aqueous composition according to claim 1, wherein the cleaning composition further comprises polyphosphate- and/or phosphonates.

11. The aqueous composition according to claim 1, wherein at least one R or at least one $R^3$ is not hydrogen.

12. An aqueous composition comprising as an additive an alkoxylated non-ionic surfactant, wherein the surfactant has an $HLB_d$ value of from 9 to 12.5 and an average degree of branching $B_s \geq 1.5$ and wherein the surfactant has the following formula:

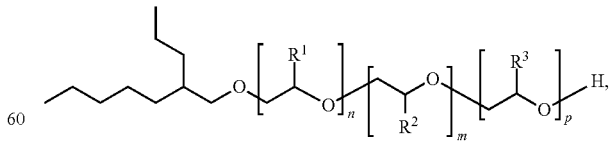

(II)

wherein:
$R^1$ is hydrogen,
$R^2$ and $R^3$ independently of one another are hydrogen, methyl, ethyl, propyl, isopropyl, or a mixture of these, n has a value of from 1 to 8,
m has a value of from 1 to 8, and
p has a value of from 0 to 8;
wherein the aqueous composition is a membrane cleaning composition.

13. An aqueous composition comprising as an additive an alkoxylated non-ionic surfactant, wherein the surfactant has an $HLB_d$ value of from 9 to 12.5 and an average degree of branching $B_s \geq 1.5$ and wherein the surfactant has the following formula:

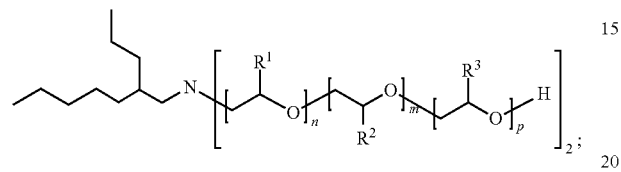

(III)

wherein:
R¹ is hydrogen,
R² and R³ independently of one another are hydrogen, methyl, ethyl, propyl, isopropyl, or a mixture of these,
n has a value of from 1 to 8,
m has a value of from 1 to 8, and
p has a value of from 0 to 8;
wherein the aqueous composition is a membrane cleaning composition.

14. A process for removing soil from a membrane, comprising the steps of i) prewashing the membrane with water,
ii) circulating on the membrane an aqueous membrane cleaning composition comprising a non-ionic surfactant, wherein the surfactant has an $HLB_d$ value of from 9 to 12.5 and an average degree of branching $B_s \geq 1.5$ and wherein the surfactant has the following formula:

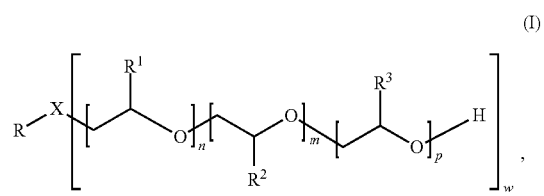

(I)

wherein
R is a $C_8$-$C_{18}$ linear hydrocarbon chain,
X is O or N,
R¹ is hydrogen,
R² and R³ independently of one another are hydrogen, methyl, ethyl, propyl, isopropyl, or a mixture of these,
n has a value of from 1 to 8,
m has a value of from 1 to 8,
p has a value of from 0 to 8, and
w is 1 if X is O, w is 2 if X is N;
iii) soaking the membrane with the membrane cleaning composition,
iv) optionally high-flow pumping
v) flushing the membrane cleaning composition out.

* * * * *